(12) United States Patent
Jia et al.

(10) Patent No.: US 11,218,273 B2
(45) Date of Patent: Jan. 4, 2022

(54) SIGNAL TRANSMISSION METHOD, RELATED DEVICE, AND SYSTEM

(71) Applicant: HUAWEI TECHNOLOGIES CO., LTD., Guangdong (CN)

(72) Inventors: Qiong Jia, Shanghai (CN); Jun Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/808,891

(22) Filed: Mar. 4, 2020

(65) Prior Publication Data

US 2020/0204327 A1 Jun. 25, 2020

Related U.S. Application Data

(63) Continuation of application No. PCT/CN2018/104233, filed on Sep. 5, 2018.

(30) Foreign Application Priority Data

Sep. 5, 2017 (CN) .......................... 201710794724.1

(51) Int. Cl.
*H04L 5/00* (2006.01)
*H04W 72/04* (2009.01)
(Continued)

(52) U.S. Cl.
CPC ........... *H04L 5/0053* (2013.01); *H04B 1/713* (2013.01); *H04L 5/0094* (2013.01);
(Continued)

(58) Field of Classification Search
CPC ............. H04W 72/12; H04W 72/0453; H04W 72/0413; H04L 5/0094
(Continued)

(56) References Cited

U.S. PATENT DOCUMENTS

2004/0142696 A1 7/2004 Saunders et al.
2012/0115526 A1 5/2012 Ogawa et al.
(Continued)

FOREIGN PATENT DOCUMENTS

CN 101304280 A 11/2008
CN 101816133 A 8/2010
(Continued)

OTHER PUBLICATIONS

Office Action in Chinese Application No. 201880057795.6, dated Feb. 5, 2021, 4 pages.
(Continued)

*Primary Examiner* — Angel T Brockman
(74) *Attorney, Agent, or Firm* — Fish & Richardson P.C.

(57) ABSTRACT

An example terminal device receives resource scheduling information sent by a network device, where the resource scheduling information is used to indicate a second resource set allocated by the network device, where the second resource set includes at least one resource block which is from a first resource set, and where the first resource set is an integer quantity of resource blocks that are evenly distributed in frequency domain. The terminal device can then perform uplink transmission on a detected idle frequency domain resource based on the resource scheduling information, where the uplink transmission occupies a plurality of time units, where a resource structure of a resource block used for the uplink transmission in each time unit is the same as a resource structure of the second resource set, and where frequency locations of resource blocks used for the uplink transmission in adjacent time units are different.

21 Claims, 13 Drawing Sheets

(51) Int. Cl.
  *H04W 72/12* (2009.01)
  *H04B 1/713* (2011.01)
(52) U.S. Cl.
  CPC ... *H04W 72/0413* (2013.01); *H04W 72/0453* (2013.01); *H04W 72/12* (2013.01)
(58) Field of Classification Search
  USPC .......................................................... 370/329
  See application file for complete search history.

(56) References Cited

U.S. PATENT DOCUMENTS

| | | |
|---|---|---|
| 2014/0321510 A1 | 10/2014 | Ahn et al. |
| 2017/0135105 A1 | 5/2017 | Li et al. |
| 2017/0332440 A1 | 11/2017 | Xu et al. |

FOREIGN PATENT DOCUMENTS

| | | |
|---|---|---|
| CN | 102763462 A | 10/2012 |
| CN | 103067327 A | 4/2013 |
| CN | 105099634 A | 11/2015 |
| WO | 2009045044 A1 | 4/2009 |

OTHER PUBLICATIONS

Extended European Search Report issued in European Application No. 18853549.6 dated Jul. 27, 2020, 8 pages.
NEC, "Frequency hopping pattern for LTE Rel-13 MTC",3GPP TSG RAN WG1 Meeting #83, R1-157480, Anaheim, USA, Nov. 15-22, 2015, 9 pages.
Office Action issued in Chinese Application No. 201880057795.6 dated Aug. 12, 2020, 14 pages (With English Translation).
MediaTek Inc.,"PRACH design in eLAA",3GPP TSG RAN WG1 Meeting #84bis, R1-162940, Busan, Korea, Apr. 11-15, 2016, 7 pages.
MediaTek Inc., "Considerations on eLAA PRACH design", 3GPP TSG RAN WG1 Meeting #85, R1-165119, May 23-27, 2016, 9 pages.
MediaTek Inc., "Considerations on PRACH for LAA", 3GPP TSG RAN WG1 Meeting #84, R1-160975, Feb. 15-19, 2016, 5 pages.
PCT International Search Report and Written Opinion in International Application PCT/CN2018/104,233, dated Nov. 23, 2018, 19 pages (With English Translation).
Office Action issued in Chinese Application No. 201710794724.1 dated May 6, 2020, 13 pages (With English Translation).

SIGNAL TRANSMISSION METHOD, RELATED DEVICE, AND SYSTEM

CROSS-REFERENCE TO RELATED APPLICATIONS

This application is a continuation of International Application No. PCT/CN2018/104233, filed on Sep. 5, 2018, which claims priority to Chinese Patent Application No. 201710794724.1, filed on Sep. 5, 2017. The disclosures of the aforementioned applications are hereby incorporated by reference in their entireties.

TECHNICAL FIELD

The present invention relates to the field of wireless communications technologies, and in particular, to a signal transmission method, a related device, and a system.

BACKGROUND

Rapid development of wireless communications technologies leads to an increasing shortage of spectrum resources, driving exploration in unlicensed frequency bands. However, there are many regulatory restrictions on use of the unlicensed frequency bands. On the one hand, there are restrictions on a occupied channel bandwidth (Occupied Channel Bandwidth, OCB) of signals in the unlicensed frequency bands. As stipulated by the European Telecommunications Standards Institute (European Telecommunications Standards Institute, ETSI), for the 2.4 GHz and 5 GHz frequency bands, a signal transmission bandwidth needs to occupy at least 80% of a system bandwidth, and for the 60 GHz frequency band, a signal transmission bandwidth needs to occupy at least 70% of a system bandwidth. However, for transmission power, a maximum power spectrum density of signals is required to be 10 dBm/MHz in the 5150-5350 MHz frequency band. On the other hand, a device that performs transmission in an unlicensed frequency band needs to first listen to whether an unlicensed spectrum is idle, for example, determine a busy/idle state of the unlicensed spectrum based on a value of receive power in the unlicensed spectrum. If the receive power is less than a specific threshold, the unlicensed spectrum is in an idle state, and the device may send a signal in the unlicensed spectrum. Otherwise, no signal is sent. This type of mechanism in which listening is performed before sending is referred to as listen before talk (Listen Before Talk, LBT for short).

For downlink transmission, a base station can use spectrum resources efficiently to meet the ETSI regulation. However, for uplink transmission, the foregoing stipulated restrictions undoubtedly bring a huge challenge to allocation of uplink resources.

In LTE Release 13, an enhanced licensed-assisted access (Enhanced Licensed Assisted Access, eLAA) technology is introduced into the uplink transmission. To efficiently use the unlicensed frequency bands while meeting the OCB regulation of the ETSI, a resource interlace (interlace) structure is used in the eLAA. The uplink resources are allocated by using a resource interlace (interlace) as a basic unit, and resources allocated to each terminal are at least one resource interlace (interlace). As shown in FIG. 1, it is assumed that a system bandwidth is 20 MHz, corresponding to 100 RBs (an RB 0 to an RB 99), each resource interlace (interlace) includes 10 resource blocks (Resource Block, RB) that are evenly distributed in the entire bandwidth, and a spacing between every two adjacent RBs in each resource interlace (interlace) is 10 RBs. This ensures that each interlace has a frequency span (a bandwidth span between RBs on two ends) of 91 RBs, approximately 16.38 MHz, which is greater than 80% of the 20 MHz system bandwidth.

However, a structure of a conventional resource interlace (interlace) is fixed and not flexible enough, and is difficult to adapt to a future flexible bandwidth scenario.

SUMMARY

This application provides a signal transmission method, a related device, and a system, to implement more flexible resource allocation, and an accumulated transmission bandwidth in a specific time period meets an OCB requirement.

According to a first aspect, this application provides a signal transmission method, applied to a network device side. The method may include: A network device may send resource scheduling information and frequency hopping information to a terminal, where the resource scheduling information is used to indicate a second resource set allocated by the network device to the terminal, and the frequency hopping information is used to indicate a frequency hopping pattern associated with the second resource set. Then, the network device may receive an uplink signal sent by the terminal.

According to a second aspect, this application provides a signal transmission method, applied to a terminal side. The method may include: A terminal may receive resource scheduling information and frequency hopping information that are sent by a network device, where the resource scheduling information is used to indicate a second resource set allocated by the network device to the terminal, and the frequency hopping information is used to indicate a frequency hopping pattern associated with the second resource set. Then, the terminal may perform uplink transmission on a detected idle frequency domain resource based on the resource scheduling information and the frequency hopping information.

Specifically, the second resource set allocated to the terminal includes at least one resource block, the at least one resource block is from a first resource set, and the first resource set is an integer quantity of resource blocks that are evenly distributed in frequency domain.

Specifically, a second resource set allocated to the terminal is based on a specified frequency hopping pattern. Herein, the specified frequency hopping pattern may be indicated by the frequency hopping information sent by the network device.

In the frequency hopping pattern provided in this application, the uplink transmission occupies a plurality of time units, where a resource structure of a resource block used for the uplink transmission in each time unit is the same as a resource structure of the second resource set, and frequency locations of resource blocks used for the uplink transmission in adjacent time units are different. Herein, the time unit, namely, a frequency hopping period, may be an integer multiple of at least one of the following: a symbol (symbol), a mini-slot (mini-slot), a slot (slot), or a subframe (subframe).

Implementation of the methods described in the first aspect and the second aspect can ensure that an accumulated bandwidth occupied by the uplink transmission in a specific time period (a plurality of frequency hopping periods) meets an OCB requirement, and more flexible resource allocation can be implemented.

With reference to the first aspect or the second aspect, in some optional embodiments, the resource scheduling information may be implemented in the following manners:

(1) Signaling Implementation of the Resource Scheduling Information

Optionally, the network device may add the resource scheduling information to downlink control information (Downlink Control Information, DCI). Specifically, a new field may be added to the DCI, where the field is used to indicate the second resource set allocated to the terminal.

Optionally, the network device may alternatively add the resource scheduling information to another acknowledgement message specific to a scheduling request (SR) of the terminal. Alternatively, the network device may encapsulate the resource scheduling information into an independent message, and return the message to the terminal. A manner of sending the resource scheduling information (namely, the signaling implementation) is not limited in this application.

(2) Content Implementation of the Resource Scheduling Information

In a first implementation, the resource scheduling information may include: an index of the first resource set to which the second resource set belongs, and an index of the second resource set in the first resource set.

Optionally, the resource scheduling information may further include: a spacing between adjacent resource blocks in the first resource set. Optionally, the spacing between the adjacent resource blocks in the first resource set may be defined by a protocol.

In a second implementation, the resource scheduling information may include: an index of the first resource set to which the second resource set belongs, an index of the second resource set in the first resource set, and an index of a subband in which the second resource set is located.

In the second implementation, the first resource set may be an integer quantity of resource blocks that are evenly distributed in a subband. The second resource set allocated by the network device to the terminal may include some resource blocks in at least one first resource set in a same subband. The second resource set allocated by the network device to the terminal may include some resource blocks in at least one first resource set in different subbands.

Optionally, the resource scheduling information may further include: a spacing between adjacent resource blocks in the first resource set. Optionally, the spacing between the adjacent resource blocks in the first resource set may be defined by a protocol.

In a third implementation, the resource scheduling information may include: a resource block number of a resource block in the second resource set.

During specific implementation, resource blocks in an entire system bandwidth may be numbered, and a specific resource block may be indicated by using a resource block number. The resource block number herein may also be referred to as a resource block index.

Without being limited to the foregoing several implementations, content of the resource scheduling information may alternatively be implemented in another manner. To be specific, the network device and the terminal may further agree on another manner to indicate the second resource set scheduled by the network device to the terminal.

With reference to the first aspect or the second aspect, in some optional embodiments, the frequency hopping information may be implemented in the following manners:

(1) Signaling Implementation of the Frequency Hopping Information

Optionally, the network device may add both the frequency hopping information and the resource scheduling information to downlink control information (DCI). Optionally, two fields may be newly added to the DCI, where one newly added field is used to indicate the second resource set allocated to the terminal, and the other newly added field is used to indicate the frequency hopping pattern.

Optionally, the network device may add both the frequency hopping information and the resource scheduling information to another acknowledgement message specific to a scheduling request (scheduling request, SR) of the terminal. Alternatively, the network device may encapsulate the frequency hopping information and the resource scheduling information together into an independent message, and return the message to the terminal.

Optionally, the network device may add the frequency hopping information and the resource scheduling information to different messages. A manner of sending the resource scheduling information (namely, the signaling implementation) is not limited in this application.

(2) Content Implementation of the Frequency Hopping Information

Specifically, the frequency hopping information may include at least one of the following: a frequency hopping offset $N_{hopping\_offset}$ associated with the second resource set, a total frequency hopping bandwidth associated with the second resource set, or a frequency hopping period associated with the second resource set.

In another embodiment of this application, the network device and the terminal may pre-agree on a frequency hopping pattern, or the frequency hopping pattern is pre-specified by a protocol, and both the network device and the terminal follow the specification by the protocol. Therefore, the network device does not need to send the frequency hopping information to the terminal. One or more of the frequency hopping information may be defined by the protocol. For example, the protocol may define that the frequency hopping offset is 10 RBs, or define that the frequency hopping period is one mini-slot. In different embodiments, a frequency hopping pattern may be reflected in a communication protocol, and the network device or the terminal performs frequency hopping based on the frequency hopping pattern. The example is merely used to explain this application and shall not be construed as a limitation.

With reference to the first aspect or the second aspect, in some optional embodiments, the frequency hopping may be performed, in the following manners, on the second resource set allocated by the network device to the terminal:

In a first manner, the frequency hopping is performed circularly based on the entire system bandwidth. Herein, the system bandwidth is divided into a plurality of first resource sets, and the first resource set includes a plurality of RBs that are evenly distributed in the entire system bandwidth.

Optionally, the at least one resource block allocated by the network device to the terminal may include an integer quantity of consecutive or nonconsecutive resource blocks in the first resource set.

Optionally, the second resource set allocated by the network device to the terminal may include some resource blocks in the at least one first resource set.

In the first manner, the second resource set allocated by the network device to the terminal may be represented as: $RB_{START}+l+i\cdot N$, where $RB_{START}$ indicates an index of a start resource block allocated to the terminal; $l \in L$, where the set L includes the index of the first resource set to which the second resource set belongs; N indicates a spacing between two adjacent RBs in the first resource set $l \in M$, where the set M includes an index, in the first resource set to which the second resource set belongs, of a resource block in the second resource set.

In the first manner, a resource block set used for the uplink transmission in a $p^{th}$ frequency hopping period may be represented as:

$$(\tilde{RB}_{start}^{P}+l+i\cdot N) \bmod N_{RB}^{Hopping}$$

where $\tilde{RB}_{start}^{P}$ indicates an index of a start RB used for the uplink transmission in the $p(p>1)^{th}$ frequency hopping period, and $N_{RB}^{Hopping}$ indicates a total quantity of resource blocks that can be used for frequency hopping transmission. And the following is satisfied:

$$\tilde{RB}_{start}^{0}=RB_{START},$$

$$\tilde{RB}_{start}^{P}=(\tilde{RB}_{start}^{P-1}+N_{hopping\_offset}) \bmod N_{RB}^{Hopping}$$

where $\tilde{RB}_{start}^{P-1}$ indicates an index of a start RB used for the uplink transmission in a $(p-1)^{th}$ frequency hopping period, and $N_{hopping\_offset}$ is the frequency hopping offset.

In a second manner, the frequency hopping is performed circularly based on a subband. Herein, the first resource set may be an integer quantity of resource blocks that are evenly distributed in a single subband.

Optionally, the second resource set allocated by the network device to the terminal may include some resource blocks in at least one first resource set in a same subband.

Optionally, the second resource set allocated by the network device to the terminal may include some resource blocks in at least one first resource set in different subbands.

Specifically, structures of first resource sets in subbands may be the same or different. In the single subband, the network device may schedule some RBs in one or more first resource sets to the terminal.

In the second manner, the second resource set allocated by the network device to the terminal may be represented as: $RB_{START}+l+i\cdot N$, where $RB_{START}$ indicates an index of a start resource block allocated to the terminal; $l \in L$, where the set L includes an index of the first resource set to which the second resource set in the single subband belongs; N indicates a spacing between two adjacent RBs in the first resource set; and $i \in M$, where the set M includes an index, in the first resource set to which the second resource set belongs, of a resource block in the second resource set in the single subband.

In the second manner, a resource block set used for the uplink transmission in a $p^{th}$ frequency hopping period may be represented as:

$$[(\tilde{RB}_{start}^{P}+l+i\cdot N) \bmod N_{RB}^{SB}]+kN_{RB}^{SB}$$

where $\tilde{RB}_{start}^{P}$ indicates an index of a start RB used for the uplink transmission in the $p(p>1)^{th}$ frequency hopping period; $N_{RB}^{SB}$ indicates a bandwidth of the subband; and $k \in K$, where the set K includes an index of the subband to which the second resource set belongs. And the following is satisfied:

$$\tilde{RB}_{start}^{0}=RB_{START},$$

$$\tilde{RB}_{start}^{P}=[(\tilde{RB}_{start}^{P-1}+N_{hopping\_offset}) \bmod N_{RB}^{SB}]+kN_{RB}^{SB}$$

where $\tilde{RB}_{start}^{P-1}$ indicates an index of a start RB used for the uplink transmission in a $(p-1)^{th}$ frequency hopping period, and $N_{hopping\_offset}$ is the frequency hopping offset.

With reference to the first aspect or the second aspect, in some optional embodiments, the first resource set may be an integer quantity of resource blocks that are evenly distributed in the entire system bandwidth, and a resource structure of the integer quantity of resource blocks may be related to the system bandwidth and/or a subcarrier spacing.

Optionally, to adapt to scenarios with a plurality of system bandwidths and/or a plurality of subcarrier spacings, the first resource set may include H resource blocks, where H is a positive integer, and H is divisible by a total quantity of resource blocks that corresponds to each of a plurality of transmission bandwidths corresponding to unlicensed frequency bands.

With reference to the first aspect or the second aspect, in some optional embodiments, to support resource alignment between different bandwidths, an RB spacing (RB spacing) in the first resource set may be a fixed value. Herein, the RB spacing is a spacing between any two adjacent RBs in the first resource set.

In this application, a plurality of first resource sets (for example, interlaces) in the system bandwidth (or the subband) may use a same resource structure, or may use different resource structures. Herein, the resource structure may mainly refer to at least one of a quantity of resource blocks or the spacing between adjacent resource blocks that are in the first resource set (for example, an interlace).

In any embodiment of this application, to facilitate correct reception by the network device, when sending the uplink signal, the terminal may further send a reference signal to the network device. In each time unit occupied by the uplink transmission, a frequency domain position of a resource carrying the reference signal may be the same as a frequency domain position of a resource block carrying the uplink signal. Optionally, the reference signal may be located at a specified position (for example, a first symbol) in each time unit in time domain.

According to a third aspect, a network device is provided. The network device includes a plurality of functional units, configured to correspondingly perform the method provided in any one of the first aspect or the possible implementations of the first aspect.

According to a fourth aspect, a terminal is provided. The terminal includes a plurality of functional units, configured to correspondingly perform the method provided in any one of the second aspect or the possible implementations of the second aspect.

According to a fifth aspect, a network device is provided. The network device is configured to perform the signal transmission method described in the first aspect. The network device may include a memory, and a processor, a transmitter, and a receiver that are coupled to the memory. The transmitter is configured to send a signal to another wireless communications device, for example, a terminal. The receiver is configured to receive the signal sent by the another wireless communications device, for example, the terminal. The memory is configured to store code for implementing the signal transmission method described in the first aspect. The processor is configured to execute program code stored in the memory, in other words, perform the signal transmission method described in any one of the first aspect or the possible implementations of the first aspect.

According to a sixth aspect, a terminal is provided. The terminal is configured to perform the signal transmission method described in the second aspect. The terminal may include a memory, and a processor, a transmitter, and a receiver that are coupled to the memory. The transmitter is configured to send a signal to another wireless communications device, for example, a network device. The receiver is configured to receive the signal sent by the another wireless communications device, for example, the network device. The memory is configured to store code for implementing the signal transmission method described in the second aspect. The processor is configured to execute program code stored in the memory, in other words, perform the signal transmission method described in any one of the second aspect or the possible implementations of the second aspect.

According to a seventh aspect, a communications system is provided. The communications system includes: a network device and a terminal, where the network device may be the network device described in the third aspect or the fifth aspect. The terminal may be the terminal described in the fourth aspect or the sixth aspect.

According to an eighth aspect, a computer-readable storage medium is provided. The readable storage medium stores an instruction, and when the instruction is run on a computer, the computer is enabled to perform the signal transmission method described in the first aspect.

According to a ninth aspect, another computer-readable storage medium is provided. The readable storage medium stores an instruction, and when the instruction is run on a computer, the computer is enabled to perform the signal transmission method described in the second aspect.

According to a tenth aspect, a computer program product including an instruction is provided. When the computer program product is run on a computer, the computer is enabled to perform the signal transmission method described in the first aspect.

According to an eleventh aspect, another computer program product including an instruction is provided. When the computer program product is run on a computer, the computer is enabled to perform the signal transmission method described in the second aspect.

BRIEF DESCRIPTION OF DRAWINGS

To describe technical solutions in this application or in the background more clearly, the following describes the accompanying drawings required for describing this application or the background.

DESCRIPTION OF EMBODIMENTS

Terms used in implementation part of the present invention are merely intended to explain specific embodiments of the present invention, but are not intended to limit the present invention.

For ease of understanding embodiments of the present invention, a wireless communications system in this application is first described.

Figure 1:
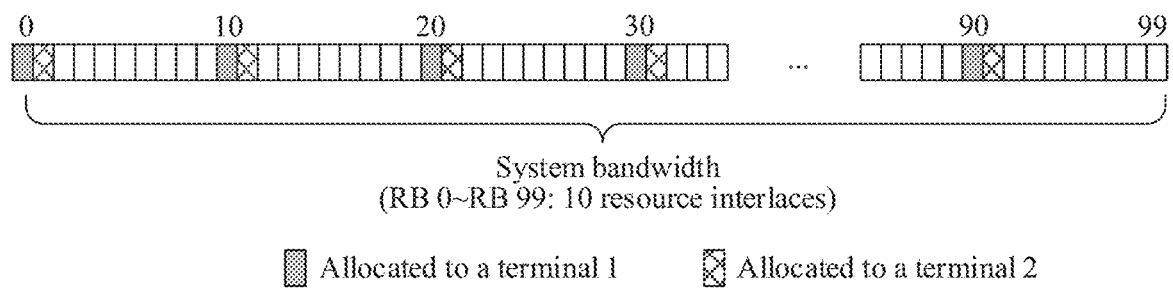
FIG. 1 is a schematic diagram of a prior-art resource allocation manner according to this application.
Figure 2:
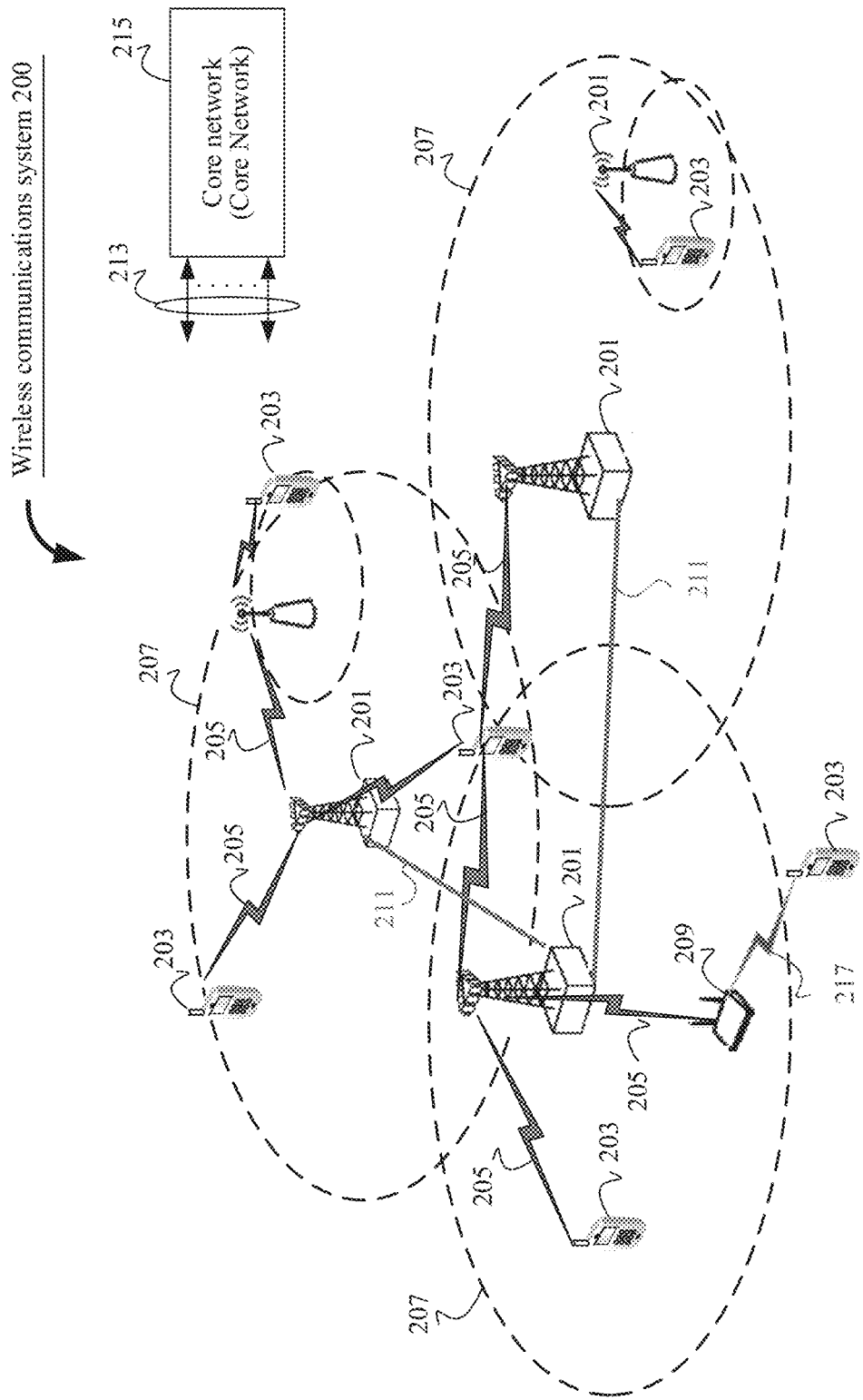
FIG. 2 is a schematic diagram of an architecture of a wireless communications system according to this application.

FIG. 2 shows a wireless communications system 200 in this application. The wireless communications system 200 may work in a licensed or an unlicensed frequency band. It may be understood that use of the unlicensed frequency band may improve a system capacity of the wireless communications system 200. As shown in FIG. 2, the wireless communications system 200 includes one or more network devices (Base Station) 201, for example, a NodeB, an eNodeB, or a WLAN access point, one or more terminals (Terminal) 203, and a core network 215.

The network device 201 may be configured to communicate with the terminal 203 under control of a network device controller (for example, a base station controller) (not shown). In some embodiments, the network device controller may be a part of the core network 215, or may be integrated into the network device 201.

The network device 201 may be configured to transmit control information (control information) or user data (user data) to the core network 215 through a backhaul (backhaul) interface (for example, an S1 interface) 213.

The network device 201 may perform wireless communication with the terminal 203 by using one or more antennas. Each network device 201 may provide communication coverage for a coverage area 207 corresponding to the network device 201. The coverage area 207 corresponding to the network device may be divided into a plurality of sectors (sector), and a sector corresponds to a part of the coverage area (not shown).

Network devices 201 may communicate with each other through a backhaul (backhaul) link 211 directly or indirectly. The backhaul link 211 herein may be a wired or wireless communication connection.

In some embodiments of this application, the network device 201 may be a base transceiver station (Base Transceiver Station), a radio transceiver, a basic service set (Basic Service Set, BSS), an extended service set (Extended Service Set, ESS), a NodeB, an eNodeB, or the like. The wireless communications system 200 may include several different types of network devices 201, for example, a macro base station (macro base station) and a micro base station (micro base station). The network device 201 may apply different wireless technologies, for example, a cell radio access technology and a WLAN radio access technology.

The terminal 203 may be distributed in the entire wireless communications system 200, and may be stationary or mobile. In some embodiments of this application, the terminal 203 may be a mobile device, a mobile station (mobile station), a mobile unit (mobile unit), a radio unit, a remote unit, a user agent, a mobile client, or the like.

In this application, the wireless communications system 200 may be an LIE communications system capable of working in an unlicensed frequency band, for example, an LTE-U, or may be a communications system such as a 5G communications system, a future new radio communications system, or the like that is capable of working in an unlicensed frequency band. The wireless communications system 200 may use a licensed-assisted access (LAA) solution to process terminal access in an unlicensed frequency band. In the LAA solution, a primary cell (Primary Cell) works in a licensed frequency band to transfer a key message and a service that requires quality of service assurance, and a secondary cell (Secondary Cell) works in an unlicensed frequency band to improve a data plane performance.

In this application, the wireless communications system 200 can support multi-carrier (multi-carrier) (waveform signals at different frequencies) operations. A multi-carrier transmitter can simultaneously transmit modulated signals on a plurality of carriers. For example, each communication connection 205 may carry multi-carrier signals modulated by using different wireless technologies. Each modulated signal may be sent on different carriers, or may carry control information (for example, a reference signal or a control channel), overhead information (Overhead Information), data, and the like.

In addition, the wireless communications system 200 may further include a Wi-Fi network. To enable harmonious coexistence of an operator network and a Wi-Fi network (working in an unlicensed spectrum), the wireless communications system 200 may use a listen before talk (LBT) mechanism. For example, in the wireless communications system 200, some terminals 203 may be connected to a Wi-Fi access point 209 through Wi-Fi communication connections 217, to use unlicensed spectrum resources, and some terminals 203 may be connected to the network device 201 through mobile communication connections 205, to use unlicensed spectrum resources. Before using an unlicensed frequency band, any device needs to listen first, to detect whether the frequency band is occupied, and can occupy the frequency band and transmit data only if the frequency band is not busy.

Figure 3:
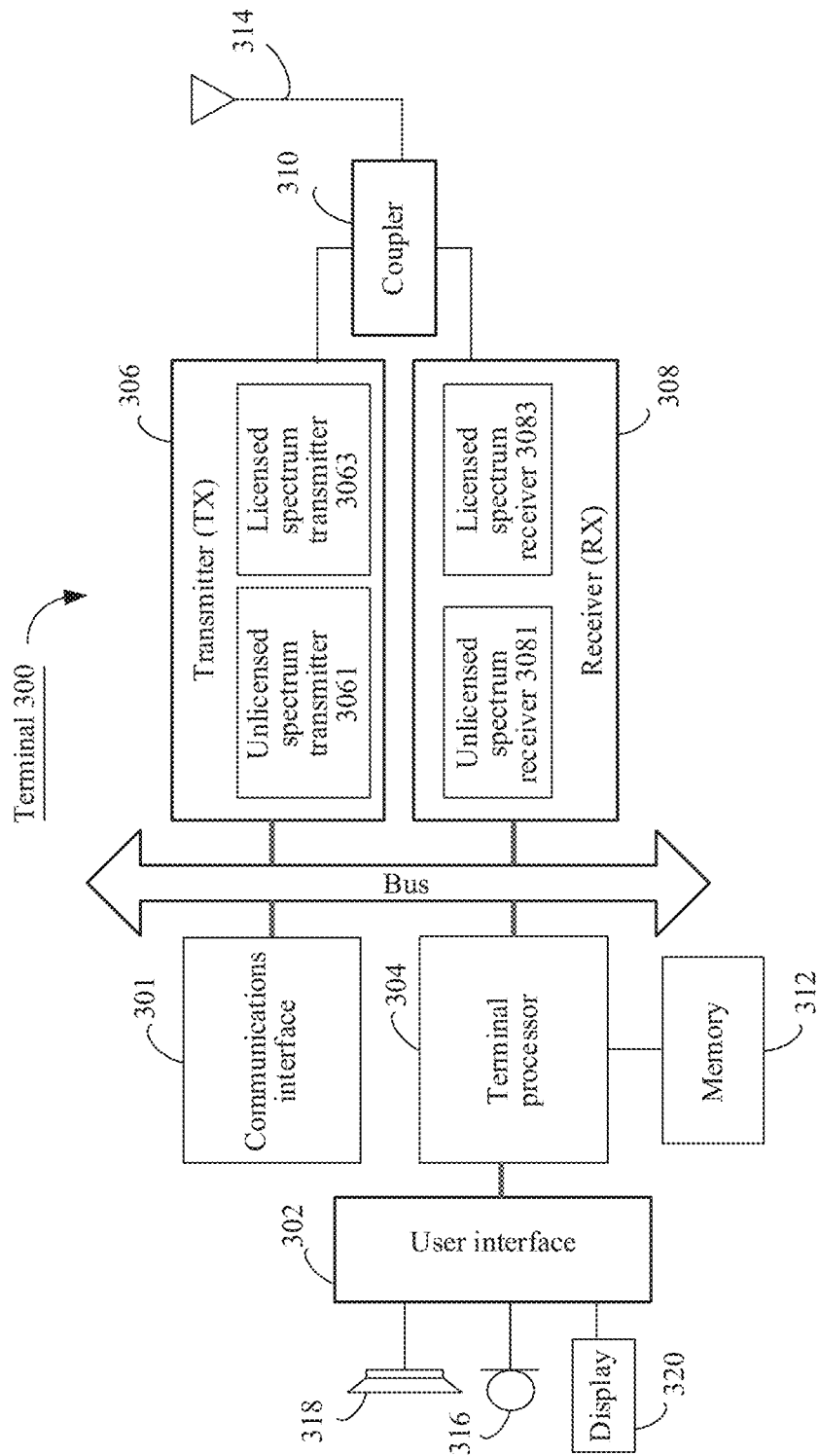
FIG. 3 is a schematic diagram of a hardware architecture of a terminal according to an embodiment of this application.

FIG. 3 shows a terminal 300 according to some embodiments of this application. As shown in FIG. 3, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected by using a bus or in another manner. In FIG. 3, an example in which a bus is used for connection is used.

A communications interface 301 may be used by the terminal 300 to communicate with another communications device, for example, a base station. Specifically, the base station may be the network device 400 shown in FIG. 4. The communications interface 301 is an interface between the terminal processor 304 and a transceiver system (including the transmitter 306 and the receiver 308), for example, an X1 interface in LTE. During specific implementation, the communications interface 301 may include one or more of a global system for mobile communications (Global System for Mobile Communications, GSM) (2G) communications interface, a wideband code division multiple access Wideband Code Division Multiple Access, WCDMA) (3G) communications interface, a long term evolution (Long Term Evolution, LTE) (4G) communications interface, and the like, or may be a 4.5G, 5G, or future new radio communications interface. In addition to a wireless communications interface, the terminal 300 may be further configured with a wired communications interface 301, for example, a local access network (Local Access Network, LAN) interface.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of signals, and allocate the plurality of signals to a plurality of receivers 308.

The transmitter 306 may be configured to perform transmission processing on a signal that is output by the terminal processor 304, for example, modulate the signal in a licensed or an unlicensed frequency band. In some embodiments of this application, the transmitter 206 may include an unlicensed spectrum transmitter 3061 and a licensed spectrum transmitter 3063. The unlicensed spectrum transmitter 3061 may support the terminal 300 in transmitting signals in one or more unlicensed spectrums, and the licensed spectrum transmitter 3063 may support the terminal 300 in transmitting signals in one or more licensed spectrums.

The receiver 308 may be configured to perform receiving processing on the mobile communication signal received by the antenna 314. For example, the receiver 308 may demodulate a received signal that has been modulated in an unlicensed or a licensed frequency band. In some embodiments of this application, the receiver 308 may include an unlicensed spectrum receiver 3081 and a licensed spectrum receiver 3083. The unlicensed spectrum receiver 3081 may support the terminal 300 in receiving a signal that is modulated in an unlicensed spectrum, and the licensed spectrum receiver 3083 may support the terminal 300 in receiving a signal that is modulated in a licensed spectrum.

In some embodiments of this application, the transmitter 306 and the receiver 308 may be considered as a wireless modem. In the terminal 300, there may be one or more transmitters 306 and receivers 308.

In addition to the transmitter 306 and the receiver 308 shown in FIG. 3, the terminal 300 may further include another communications component, for example, a GPS module, a Bluetooth (Bluetooth) module, or a wireless fidelity (Wireless Fidelity, Wi-Fi) module. In addition to the wireless communication signal described above, the terminal 300 may further support another wireless communication signal, for example, a satellite signal or a short-wave signal. In addition to supporting wireless communication, the terminal 300 may be further configured with a wired network interface (for example, a LAN interface) to support wired communication.

The input/output modules may be configured to implement interaction between the terminal 300 and a user/an external environment, and may mainly include the audio input/output module 318, the key input module 316, the display 320, and the like. During specific implementation, the input/output modules may further include a camera, a touchscreen, a sensor, and the like. The input/output modules all communicate with the terminal processor 304 through the user interface 302.

The memory 312 is coupled to the terminal processor 304, and configured to store various types of software programs and/or a plurality of sets of instructions. During specific implementation, the memory 312 may include a high-speed random access memory, and may also include a nonvolatile memory, such as one or more disk storage devices, a flash memory device, or another nonvolatile solid-state storage device. The memory 312 may store an operating system (briefly referred to as a system below), for example, an embedded operating system such as Android, iOS, Windows, or Linux. The memory 312 may further store a network communications program. The network communications program may be configured to communicate with one or more additional devices, one or more terminal devices, or one or more network devices. The memory 312 may further store a user interface program. The user interface program may use a graphical operation interface to vividly display content of an application program, and use input controls such as a menu, a dialog box, and a key to receive a control operation of a user on the application program.

In some embodiments of this application, the memory 312 may be configured to store an implementation program of a signal transmission method provided in one or more embodiments of this application on a terminal 300 side. For implementation of the signal transmission method provided in one or more embodiments of this application, refer to the following embodiments.

The terminal processor 304 may be configured to read and execute a computer readable instruction. Specifically, the terminal processor 304 may be configured to: invoke a program stored in the memory 312, for example, the implementation program of the signal transmission method provided in one or more embodiments of this application on the terminal 300 side, and execute an instruction included in the program.

It may be understood that the terminal 300 may be the terminal 203 in the wireless communications system 200 shown in FIG. 2, and may be implemented as a mobile device, a mobile station (mobile station), a mobile unit (mobile unit), a radio unit, a remote unit, a user agent, a mobile client, or the like.

It should be noted that the terminal 300 shown in FIG. 3 is merely an implementation of this application. In actual application, the terminal 300 may alternatively include more or fewer components. This is not limited herein.

Figure 4:
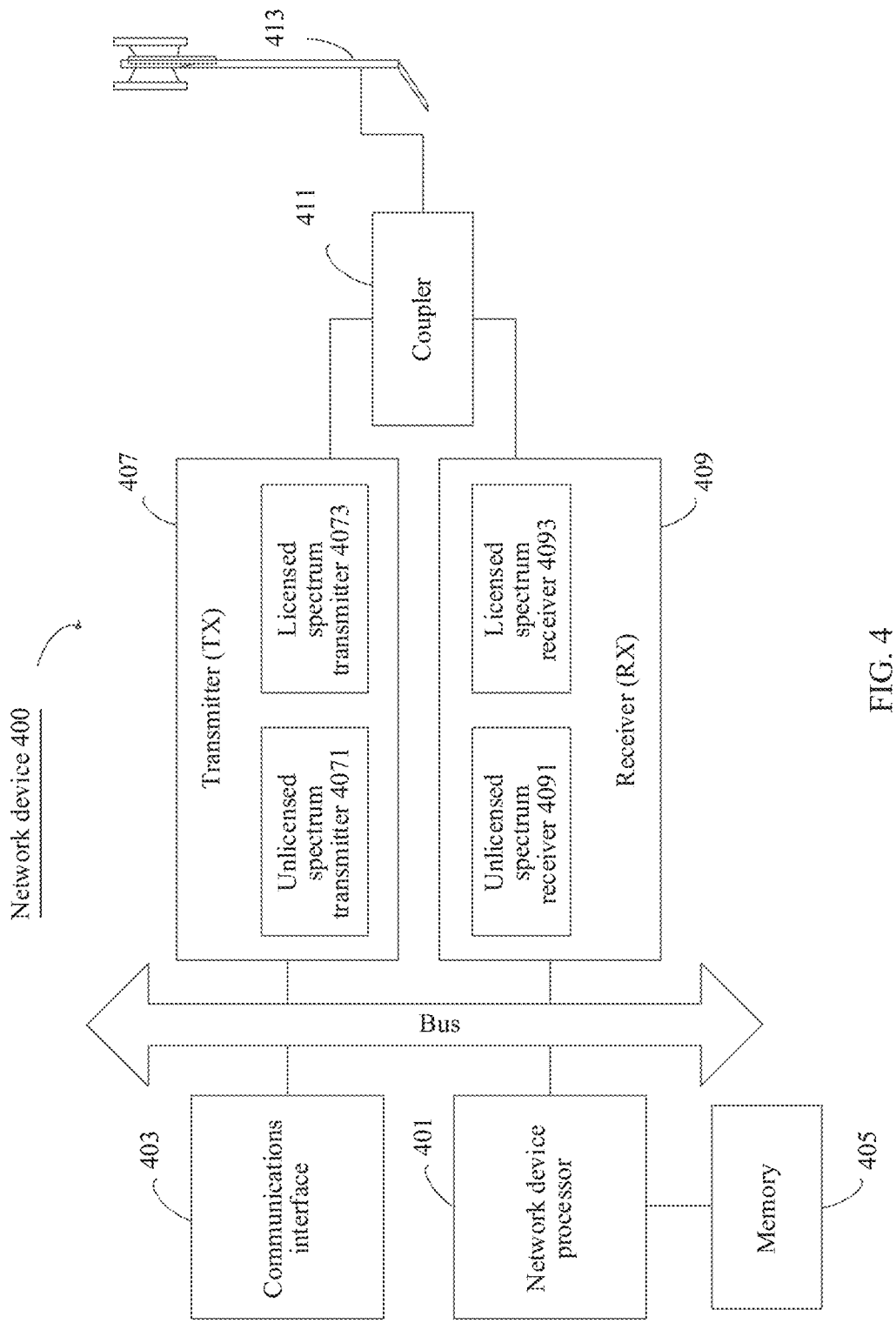
FIG. 4 is a schematic diagram of a hardware architecture of a base station according to an embodiment of this application.

FIG. 4 shows a network device 400 according to some embodiments of this application. As shown in FIG. 4, the network device 400 may include a communications interface 403, one or more base station processors 401, a transmitter 407, a receiver 409, a coupler 411, an antenna 413, and a memory 405. These components may be connected by using a bus or in another manner. In FIG. 4, an example in which a bus is used for connection is used.

The communications interface 403 may be used by the network device 400 to communicate with another communications device, for example, a terminal device or another base station. Specifically, the terminal device may be the terminal 300 shown in FIG. 3. The communications interface 403 is an interface between the base station processor 401 and a transceiver system (including the transmitter 407 and the receiver 409), for example, an S1 interface in LTE. During specific implementation, the communications interface 403 may include one or more of a global system for mobile communications (GSM) (2G) communications interface, a wideband code division multiple access (WCDMA) (3G) communications interface, a long term evolution (LTE) (4G) communications interface, and the like, or may be a 4.5G, 5G, or future new radio communications interface. In addition to a wireless communications interface, the network device 400 may be further configured with a wired communications interface 403 to support wired communication. For example, a backhaul link between one network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of signals, and allocate the plurality of signals to a plurality of receivers 409.

The transmitter 407 may be configured to perform transmission processing on a signal that is output by the base station processor 401, for example, modulate the signal in a licensed or an unlicensed frequency band. In some embodiments of this application, the transmitter 407 may include an unlicensed spectrum transmitter 4071 and a licensed spectrum transmitter 4073. The unlicensed spectrum transmitter 4071 may support the network device 400 in transmitting signals in one or more unlicensed spectrums, and the licensed spectrum transmitter 4073 may support the network device 400 in transmitting signals in one or more licensed spectrums.

The receiver 409 may be configured to perform receiving processing on the mobile communication signal received by the antenna 413. For example, the receiver 409 may demodulate a received signal that has been modulated in an unlicensed or licensed frequency band. In some embodiments of this application, the receiver 409 may include an unlicensed spectrum receiver 4091 and a licensed spectrum receiver 4093. The unlicensed spectrum receiver 4091 may support the network device 400 in receiving a signal that is modulated in an unlicensed spectrum, and the licensed spectrum receiver 4093 may support the network device 400 in receiving a signal that is modulated in a licensed spectrum.

In some embodiments of this application, the transmitter 407 and the receiver 409 may be considered as a wireless modem. In the network device 400, there may be one or more transmitters 407 and receivers 409.

The memory 405 is coupled to the base station processor 401, and configured to store various types of software programs and/or a plurality of sets of instructions. During specific implementation, the memory 405 may include a high-speed random access memory, and may alternatively include a nonvolatile memory, for example, one or more disk storage devices, a flash memory device, or another nonvolatile solid-state storage device. The memory 405 may store an operating system (briefly referred to as a system below), for example, an embedded operating system such as uCOS, VxWorks, or RTLinux. The memory 405 may further store a network communications program. The network communications program may be configured to communicate with one or more additional devices, one or more terminal devices, or one or more network devices.

The base station processor 401 may be configured to: manage a radio channel, establish or remove a call or a communications link, and control cross-region handover of user equipment in a local control area. During specific implementation, the base station processor 401 may include: an administration module/communication module (Administration Module/Communication Module, AM/CM) (a center for speech channel switching and information exchange), a basic module (Basic Module, BM) (configured to implement call processing, signaling processing, radio resource management, radio link management, and circuit maintenance functions), a transcoder and submultiplexer (Transcoder and SubMultiplexer, TCSM) (configured to implement multiplexing/demultiplexing and transcoding functions), and the like.

In this application, the base station processor 401 may be configured to read and execute a computer readable instruction. Specifically, the base station processor 401 may be configured to: invoke a program stored in the memory 405, for example, an implementation program of a signal transmission method provided in one or more embodiments of this application on a network device 400 side, and execute an instruction included in the program.

It may be understood that the network device 400 may be the network device 201 in the wireless communications system 200 shown in FIG. 2, and may be implemented as a base transceiver station, a radio transceiver, a basic service set (BSS), an extended service set (ESS), a NodeB, an eNodeB, or the like. The network device 400 may be implemented by several different types of base stations, for example, a macro base station and a micro base station. The base station 400 may apply different wireless technologies, for example, a cell radio access technology and a WLAN radio access technology.

It should be noted that the network device 400 shown in FIG. 4 is merely an implementation of this application. In actual application, the network device 400 may alternatively include more or fewer components. This is not limited herein.

Based on the embodiments corresponding to the wireless communications system 200, the terminal 300, and the network device 400, this application provides a signal transmission method.

A main inventive principle of this application may include: for uplink transmission in an unlicensed frequency band, a network device allocates at least one resource block to a terminal. The at least one resource block may be from a first resource set, that is, may include some resource blocks in the first resource set. The first resource set is an integer quantity of resource blocks that are evenly distributed in frequency domain. Optionally, the first resource set may be a resource interlace (interlace). The at least one resource block is based on a specified frequency hopping pattern (frequency hopping pattern). In other words, the uplink transmission may occupy a plurality of time units. A resource structure of a resource block used for the uplink transmission in each time unit is the same as a resource structure of a second resource set, and frequency locations of resource blocks used for the uplink transmission in adjacent time units are different. In this way, it can be ensured that an accumulated bandwidth occupied by the uplink transmission in a specific time period (a plurality of frequency hopping periods) meets an OCB requirement, and more flexible resource allocation can be implemented.

In this application, the at least one resource block allocated by the network device to the terminal may be referred to as the second resource set.

To facilitate understanding of the main inventive principle of this application, the following provides descriptions by using examples.

Figure 5:
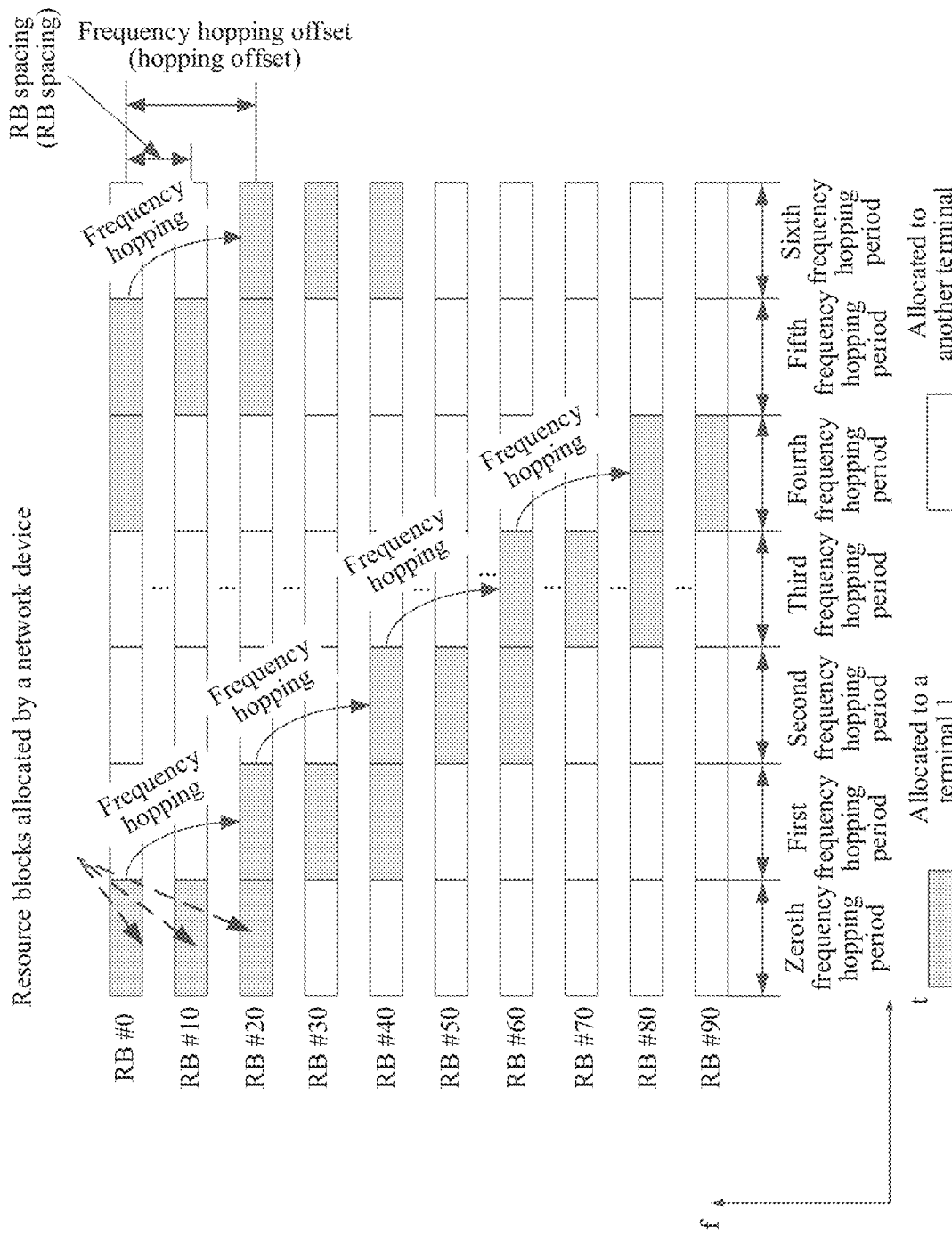
FIG. 5 is a schematic diagram in which at least one resource block undergoes frequency hopping based on a specified frequency hopping pattern according to this application.

FIG. 5 shows an example of a resource pattern (pattern) obtained after a second resource set undergoes frequency hopping based on a specified frequency hopping pattern. It is assumed that a system bandwidth is 100 RBs, an interlace includes 10 RBs, and a spacing between adjacent RBs in the interlace is 10 RBs. Alternatively, it is assumed that a system bandwidth is 106 RBs, an interlace includes 10 or 11 RBs, and a spacing between adjacent RBs in the interlace is 10 RBs.

As shown in FIG. 5, a network device allocates three resource blocks (that is, the second resource set) to a terminal 1, and the three resource blocks may be the first three resource blocks in an interlace (that is, a first resource set): an RB 0, an RB 10, and an RB 20. Frequency hopping is performed on the three resource blocks once every other frequency hopping period (in this embodiment, a frequency hopping period is a time unit), and a frequency hopping offset is 20 RBs. Specifically, in the zeroth frequency hopping period, resource blocks used for uplink transmission are the RB 0, the RB 10, and the RB 20. In the first frequency hopping period, the RB 0 hops to the RB 20, the RB 10 hops to an RB 30, and the RB 20 hops to an RB 40. In other words, resource blocks used for the uplink transmission are the RB 20, the RB 30, and the RB 40. By analogy, in the zeroth to the third frequency hopping periods, resource blocks used for the uplink transmission are the RB 0, the RB 10, the RB 20, the RB 30, the RB 40, . . . , and an RB 80. That is, in the zeroth to the fourth frequency hopping periods, an accumulated bandwidth occupied by the uplink transmission is 91 RBs, and a bandwidth occupancy of the 91 RBs is: 90*0.18 M/40 M=81.9%. That is, 91 RBs occupy more than 80% of the system bandwidth, meeting an OCB requirement.

FIG. 5 is merely used to explain this application and shall not be construed as a limitation.

In this application, the second resource set allocated by the network device to the terminal may represent, based on the specified frequency hopping pattern (frequency hopping pattern), a resource block used for the uplink transmission. As can be seen from FIG. 5, resource blocks used for the uplink transmission are distributed in a plurality of time units, and a resource structure of a resource block used for the uplink transmission in each time unit is the same as a resource structure of the second resource set. Resource blocks used for the uplink transmission in the first time unit are the second resource set, and a difference between frequency locations of resource blocks used for the uplink transmission in adjacent time units may be a specified frequency hopping offset (hopping offset).

In this application, that the resource structures are the same means that quantities of resource blocks are the same, and spacings between adjacent resource blocks are the same. In the example in FIG. 5, a quantity of resource blocks used for the uplink transmission in each frequency hopping period is three, and is the same as a quantity of resource blocks (the RB 0, the RB 10, and the RB 20) allocated by the network device to the terminal. A spacing between adjacent resource blocks used for the uplink transmission in each frequency hopping period is 10 RBs, and is the same as a spacing (10 RBs) between adjacent resource blocks allocated by the network device to the terminal.

In this application, the frequency hopping of the second resource set may be cyclic frequency hopping that is based on an entire frequency hopping bandwidth (for example, the system bandwidth or a subband). For example, as shown in FIG. 5, in a fifth frequency hopping period, an RB 60 hops to the RB 80, an RB 70 hops to an RB 90, and the RB 80 hops to the RB 0. Because the RB 90 is the last RB in the interlace, the RB 80 hops to the RB 0 cyclically.

Herein, the time unit may be the frequency hopping period (hopping period), and the frequency hopping period (hopping period) may be an integer multiple of at least one of the following: a symbol (symbol), a mini-slot (mini-slot), a slot (slot), or a subframe (subframe).

In an implementation of this application, the subband (subband) refers to one or more carrier, or some subcarriers, some resource blocks, or the like on a carrier. In some scenarios, the subband may alternatively be a bandwidth part (bandwidth part, BWP), which refers to a part of bandwidth in the system bandwidth.

In this application, the network device may send resource scheduling information to the terminal. The resource scheduling information may be used to indicate the second resource set allocated by the network device to the terminal, namely, the at least one resource block. After receiving the resource scheduling information, the terminal may perform, based on the specified frequency hopping pattern, frequency hopping on the at least one resource block allocated by the network device, to determine a resource block used for the uplink transmission. Herein, for a definition and description of the resource block used for the uplink transmission, refer to the foregoing content. Details are not described herein again. Finally, the terminal may perform the uplink transmission on an idle resource block used for the uplink transmission through LBT. It may be understood that the network device and the terminal both need to perform the LBT in an unlicensed frequency band before transmitting a signal. Finally, the terminal may perform the uplink transmission on an idle frequency resource.

(1) Signaling Implementation of the Resource Scheduling Information

Optionally, the network device may add the resource scheduling information to downlink control information (Downlink Control Information, DCI). Specifically, a new field may be added to the DCI. The field is used to indicate the second resource set allocated to the terminal, that is, the at least one resource block.

For example, the network device may add the resource scheduling information to an uplink scheduling grant (uplink scheduling grant) returned to the terminal. The UL grant herein is a type of the DCI, and uses a DCI format 0/0A/0B/4/4A/4B.

Optionally, the network device may alternatively add the resource scheduling information to another acknowledgement message specific to a scheduling request (scheduling request, SR) of the terminal, or the network device may encapsulate the resource scheduling information into an independent message, and return the message to the terminal. A manner of sending the resource scheduling information (namely, the signaling implementation) is not limited in this application.

(2) Content Implementation of the Resource Scheduling Information

In a first implementation, the resource scheduling information may include: an index of the first resource set to which the second resource set belongs, and an index of the second resource set in the first resource set. For example, in the example in FIG. 5, it is assumed that the network device allocates the RB 0, the RB 10, and the RB 20 to the terminal from the interlace 0 (that is, the first resource set), and the resource scheduling information may include: an index "0" of the interlace 0, and indexes "0", "1", and "2" respectively of the RB 0, the RB 10, and the RB 20 in the interlace 0. The example is merely used to explain this application and shall not be construed as a limitation.

Optionally, the resource scheduling information may further include: a spacing between adjacent resource blocks in the first resource set. Optionally, the spacing between the adjacent resource blocks in the first resource set may be defined by a protocol.

In a second implementation, the resource scheduling information may include: an index of the first resource set to which the second resource set belongs, an index of the second resource set in the first resource set, and an index of a subband in which the second resource set is located.

In the second implementation, the first resource set may be an integer quantity of resource blocks that are evenly distributed in a subband. The second resource set allocated by the network device to the terminal may include some resource blocks in at least one first resource set in a same subband. The second resource set allocated by the network device to the terminal may include some resource blocks in at least one first resource set in different subbands. For detailed description of the second implementation, refer to subsequent embodiments of FIG. 9 and FIG. 10. Details are not described herein.

Optionally, the resource scheduling information may further include: a spacing between adjacent resource blocks in the first resource set. Optionally, the spacing between the adjacent resource blocks in the first resource set may be defined by a protocol.

In a third implementation, the resource scheduling information may include: a resource block number of a resource block in the second resource set.

During specific implementation, resource blocks in the entire system bandwidth may be numbered, and a specific resource block may be indicated by using a resource block number. The resource block number herein may also be referred to as a resource block index. For example, in the example in FIG. 5, the resource scheduling information may include: numbers "0", "10", and "20" respectively of the RB 0, the RB 10, and the RB 20 in the entire system bandwidth. The example is merely used to explain this application and shall not be construed as a limitation.

Without being limited to the foregoing several implementations, content of the resource scheduling information may alternatively be implemented in another manner. To be specific, the network device and the terminal may further agree on another manner to indicate the second resource set scheduled by the network device to the terminal, namely, the at least one resource block.

In an embodiment of this application, the network device may notify the terminal of the specified frequency hopping pattern on which the second resource set allocated by the network device to the terminal is based. Specifically, the network device may send frequency hopping information to the terminal.

(1) Signaling Implementation of the Frequency Hopping Information

Optionally, the network device may add both the frequency hopping information and the resource scheduling information to downlink control information (DCI). Optionally, two fields may be newly added to the DCI. One newly added field is used to indicate the second resource set allocated to the terminal, and the other newly added field is used to indicate the frequency hopping pattern.

For example, the network device may add both the frequency hopping information and the resource scheduling information to an uplink scheduling grant (UL grant) returned to the terminal. The UL grant herein is a type of the DCI, and uses a DCI format 0/0A/0B/4/4A/4B.

Optionally, the network device may add both the frequency hopping information and the resource scheduling information to another acknowledgement message specific to a scheduling request (scheduling request, SR) of the terminal. Alternatively, the network device may encapsulate the frequency hopping information and the resource scheduling information together into an independent message, and return the message to the terminal.

Optionally, the network device may add the frequency hopping information and the resource scheduling information to different messages. A manner of sending the resource scheduling information (namely, the signaling implementation) not limited in this application.

(2) Content Implementation of the Frequency Hopping Information

Specifically, the frequency hopping information may include at least one of the following: a frequency hopping offset $N_{hopping\_offset}$ associated with the second resource set, a total frequency hopping bandwidth associated with the second resource set, or a frequency hopping period associated with the second resource set.

In another embodiment of this application, the network device and the terminal may pre-agree on a frequency hopping pattern, or the frequency hopping pattern is pre-specified by a protocol, and both the network device and the terminal follow the specification by the protocol. Therefore, the network device does not need to send the frequency hopping information to the terminal. One or more of the frequency hopping information may be defined by the protocol. For example, the protocol may define that the frequency hopping offset is 10 RBs, or define that the frequency hopping period is one mini-slot. In different embodiments, a frequency hopping pattern may be reflected in a communication protocol, and the network device or the terminal performs frequency hopping based on the frequency hopping pattern. The example is merely used to explain this application and shall not be construed as a limitation.

In addition to the resource interlace (interlace), the first resource set in this application may alternatively be a plurality of resource blocks that present another resource structure, provided that the resource blocks in the first resource set are evenly distributed in frequency domain. Without being limited to the OCB regulation of the ETSI, the technical solutions provided in this application are also applicable to a future scenario and another scenario in which a channel bandwidth occupancy of a signal is specified and required.

The following uses a plurality of embodiments to describe in detail how to perform frequency hopping on the resource block allocated to the terminal.

(1) Embodiment 1

In this embodiment, a system bandwidth is divided into a plurality of first resource sets, and the first resource set includes a plurality of RBs that are evenly distributed in the entire system bandwidth. Optionally, the first resource set may use an interlace structure in eLAA. During resource allocation, a network device uses some consecutive RBs in the first resource set as a second resource set. In other words, the second resource set allocated by the network device to a terminal includes an integer quantity of consecutive resource blocks in the first resource set.

Then, the network device may send resource scheduling information and frequency hopping information to the terminal. The resource scheduling information is used to indicate the second resource set allocated by the network device to the terminal, and the frequency hopping information is used to indicate a frequency hopping manner associated with the second resource set. Correspondingly, the terminal may perform uplink frequency hopping transmission on a corresponding resource based on scheduling by the network device. Optionally, the frequency hopping manner (for example, a frequency hopping offset $N_{hopping\_offset}$, a total frequency hopping bandwidth $N_{RB}^{Hopping}$, or a frequency hopping period) may also be defined by a protocol, and the network device does not need to send the frequency hopping information to the terminal. It should be noted that, in an unlicensed frequency band, the network device and the terminal both need to perform LBT before transmitting a signal.

Specifically, the second resource set allocated by the network device to the terminal may be represented as: $RB_{START}+l+i\cdot N$, where $RB_{START}$ indicates an index of a start resource block allocated to the terminal; $l \in L$, where the set L includes an index of the first resource set to which the second resource set belongs; N indicates a spacing between two adjacent RBs in the first resource set; and $i \in M$, where the set M includes an index, in the first resource set to which the second resource set belongs, of a resource block in the second resource set.

Specifically, when frequency hopping is performed, the second resource set allocated by the network device to the terminal periodically hops in frequency domain. A resource block set used for uplink transmission in a $p^{th}$ frequency hopping period is:

$$(\tilde{RB}_{start}^{p}+l+i\cdot N) \bmod N_{RB}^{Hopping}$$

where $\tilde{RB}_{start}^{p}$ indicates an index of a start RB used for the uplink transmission in the $(p>1)^{th}$ frequency hopping period, $N_{RB}^{Hopping}$ indicates a total quantity of resource blocks that can be used for the frequency hopping transmission, and the following is satisfied:

$$\tilde{RB}_{start}^{0}=RB_{START},$$

$$\tilde{RB}_{start}^{p}=(\tilde{RB}_{start}^{p-1}+N_{hopping\_offset}) \bmod N_{RB}^{Hopping}$$

where $\tilde{RB}_{start}^{p-1}$ indicates an index of a start RB used for the uplink transmission in a $(p-1)^{th}$ frequency hopping period, and $N_{hopping\_offset}$ frequency hopping offset.

Herein, resource blocks used for the uplink transmission in a plurality of frequency hopping periods include resource blocks used for the uplink transmission in each of the plurality of frequency hopping periods.

In this embodiment, the frequency hopping period may be an integer multiple of at least one of the following: a symbol, a mini-slot, a slot, or a subframe.

Specific implementation of Embodiment 1 is described below by using FIG. 6 as an example.

Assumption 1: The system bandwidth is 20 MHz, a subcarrier spacing is 15 kHZ, and a transmission bandwidth is $N_{RB}^{UL}=100$ RB. The first resource set is an interlace including 10 RBs that are evenly distributed in frequency domain (for example, an RB #0, an RB #10, an RB #20, . . . , an RB #80, and an RB #90 in FIG. 6). Resource allocation starts from the RB #0 (that is, $RB_{START}=0$).

Assumption 2: The spacing (that is, an RB spacing) between two adjacent RBs in the first resource set is 10 RBs. The frequency hopping offset (hopping offset) is 20 RBs.

The second resource set allocated by the network device to the terminal is: $RB_{START}+l+i\cdot N$, where $RB_{START}=0$, $l \in L$, $L=\{0\}$, $i \in M$, $M=\{0,1,2\}$, and $N=10$. Therefore, the second resource set is:

$$0+\{0\}+\{0,1,2\}*10=\{0,10,20\}$$

Figure 6:
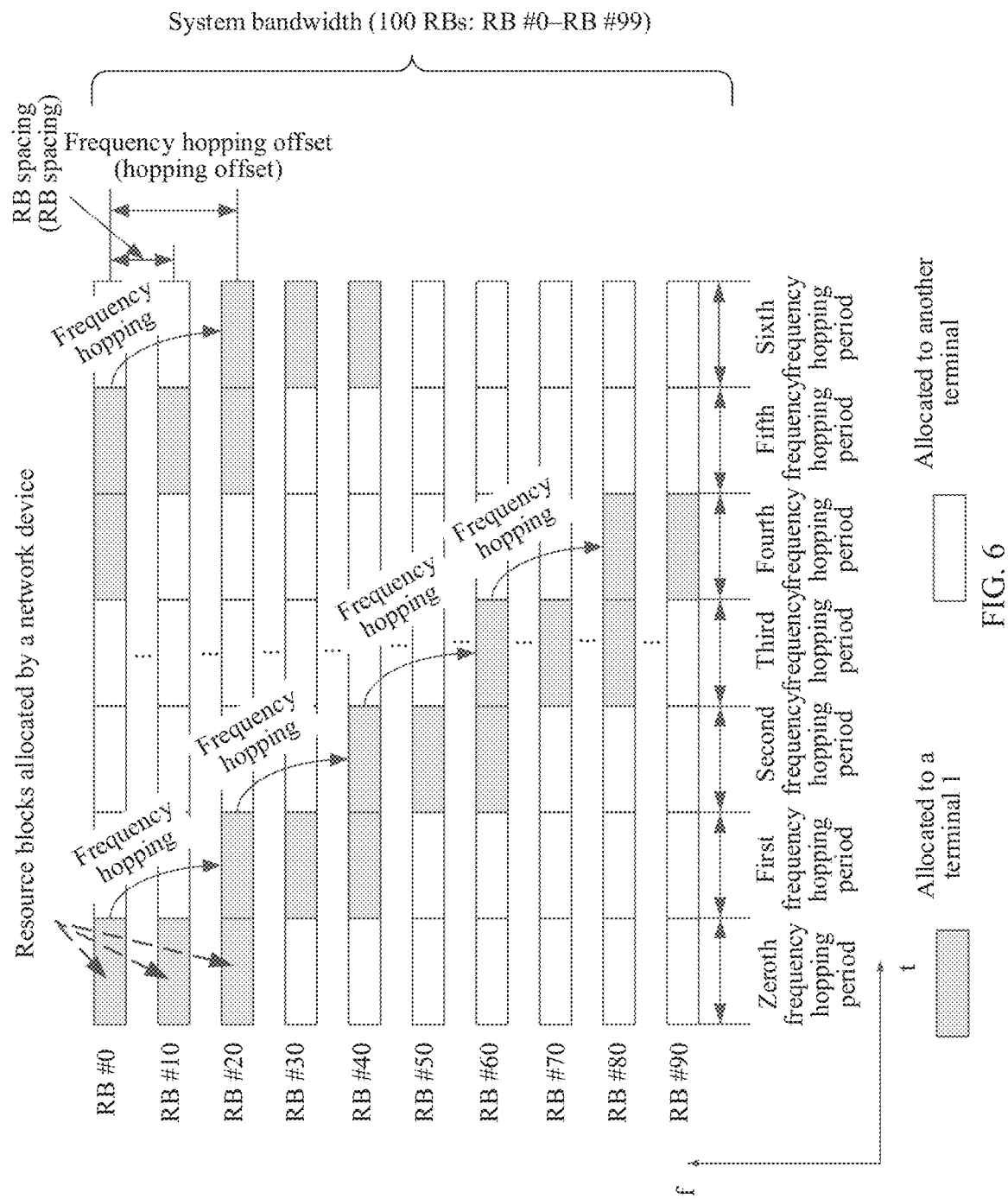
FIG. 6 is a schematic diagram of resources on which frequency hopping is performed in a system bandwidth according to an embodiment of this application.

Resource blocks indicated in the foregoing set are the RB #0, the RB #10, and the RB #20 in FIG. 6, and are resource blocks used for the uplink transmission in the zeroth frequency hopping period.

A start RB ($\tilde{RB}_{start}^p$) used for the uplink transmission in a p(p>1)$^{th}$ frequency hopping period is:

$$\tilde{RB}_{start}^0 = RB_{START},$$

$$\tilde{RB}_{start}^p = (\tilde{RB}_{start}^{P-1} + N_{hopping\_offset}) \bmod N_{RB}^{Hopping}$$

where $RB_{START}=0$ (a start RB used for the uplink transmission in the zeroth frequency hopping period), $N_{hopping\_offset}=20$, and $N_{RB}^{Hopping}=100$. Details are as follows:

A start RB ($\tilde{RB}_{start}^1$) used for the uplink transmission in the first frequency hopping period is: (0+20) mod 100=20, that is, the B #20.

A start RB ($\tilde{RB}_{start}^2$) used for the uplink transmission in the second frequency hopping period is: (20+20) mod 100=40, that is, an RB #40.

A start RB used for the uplink transmission in each subsequent frequency hopping period may be deduced by analogy. Details are not described again.

A resource block set used for the uplink transmission in the p$^{th}$ frequency hopping period is:

$$(\tilde{RB}_{start}^p + l + i \cdot N) \bmod N_{RB}^{Hopping}$$

Details are as follows:

Resource blocks used for the uplink transmission in the first frequency hopping period are: 20+{0}+{0, 1,2}*10={40, 50, 60}, that is, the RB #20, an RB #30, and the RB #40.

Resource blocks used for the uplink transmission in the second frequency hopping period are: 40+{0}+{0, 1, 2}*10={40, 50, 60}, that is, the RB #40, an RB #50, and an RB #60.

Resource blocks used for the uplink transmission in each subsequent frequency hopping period may be deduced by analogy. Details are not described again.

As can be seen from FIG. 6, through the frequency hopping, an accumulated bandwidth occupied by resource blocks (the RB #0, the RB #10, and the RB #20) allocated by the network device to the terminal in a specific time period (in the zeroth to the fourth frequency hopping periods) is 91 RBs, and a bandwidth occupancy of the 91 RBs is: 90*0.18 M/20 M=81.9%. That is, the 91 RBs occupy more than 80% of the system bandwidth, meeting an OCB requirement. In addition, the network device does not need to use the entire interlace as a basic scheduling unit, thereby greatly reducing a resource scheduling granularity, and improving resource scheduling flexibility.

A specific implementation of Embodiment 1 is further described below by using FIG. 12 as an example.

Assumption 1: The system bandwidth is 20 MHz, a subcarrier spacing is 15 kHZ, and a transmission bandwidth is 106 RBs. The first resource set is an interlace including 10 or 11 RBs that are evenly distributed in frequency domain (as shown in FIG. 12, an interlace #0 corresponds to 11 RBs: an RB #0, an RB #10, an RB #20, . . . , an RB #80, an RB #90, and an RB #100, and an interlace #9 corresponds to 10 RBs: an RB #9, an RB #19, an RB #29, . . . , an RB #89, and an RB #99). Resource allocation starts from the RB 0 (that is, $RB_{START}=0$).

Assumption 2: The spacing (that is, an RB spacing) between two adjacent RBs in the first resource set is 10 RBs. The frequency hopping offset (hopping offset) is 20 RBs.

The second resource set allocated by the network device to the terminal is: $RB_{START}+l+i \cdot N$, where $RB_{START}=0$, l∈L, L={0}, i∈M, M={0,1,2}, and N=10. Therefore, the second resource set is:

$$0+\{0\}+\{0,1,2\}*10=\{0,10,20\}$$

Figure 12:
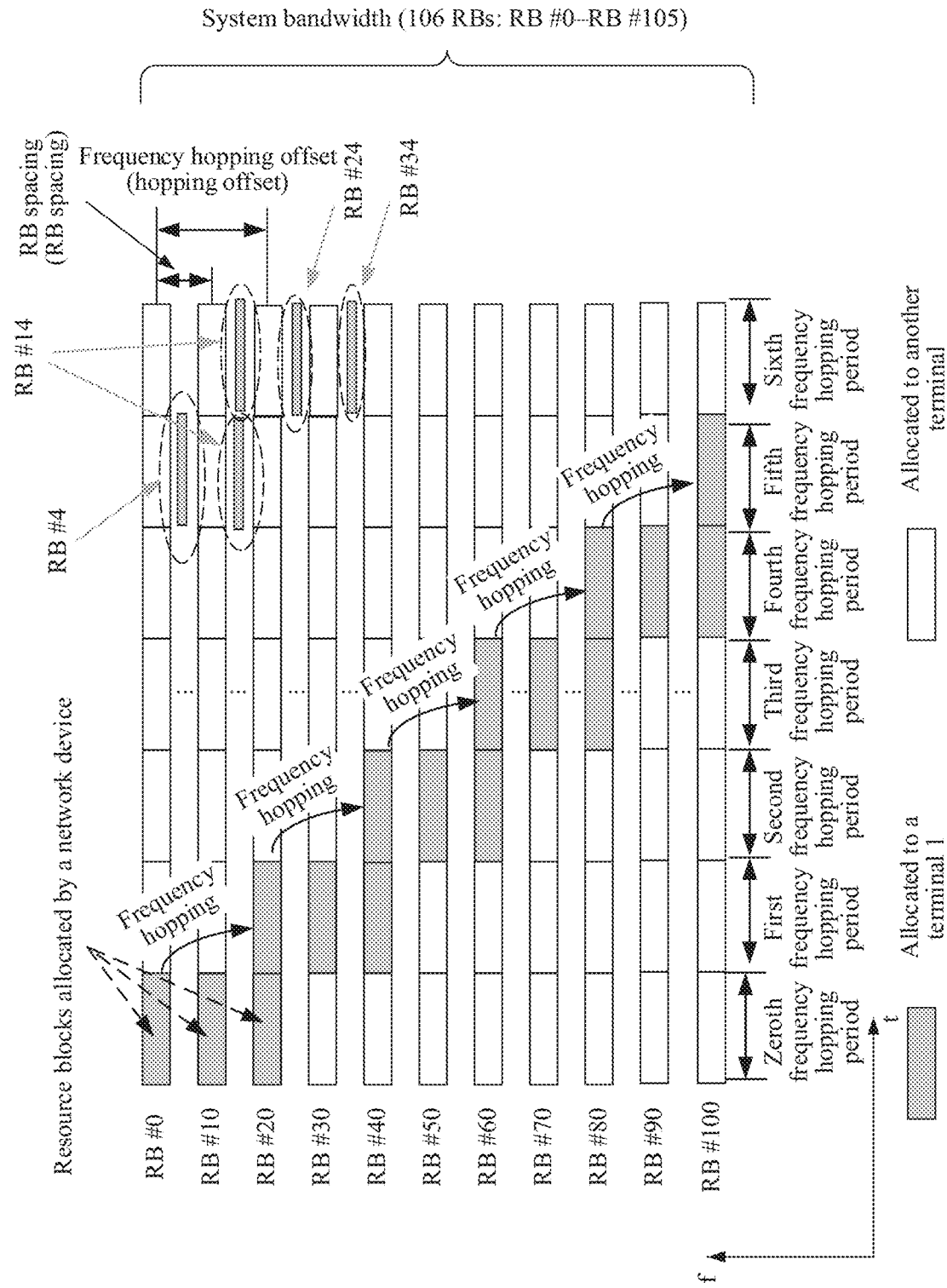
FIG. 12 is a schematic diagram of resources on which frequency hopping is performed in a system bandwidth according to still another embodiment of this application.

Resource blocks indicated in the foregoing set are the RB #0, the RB #10, and the RB #20 in FIG. 12, and are resource blocks used for the uplink transmission in the zeroth frequency hopping period.

A start RB ($\tilde{RB}_{start}^p$) used for the uplink transmission in a p(p>1) to frequency hopping period is:

$$\tilde{RB}_{start}^0 = RB_{START},$$

$$\tilde{RB}_{start}^p = (\tilde{RB}_{start}^{P-1} + N_{hopping\_offset}) \bmod N_{RB}^{Hopping}$$

where $RB_{START}=0$ (a start RB used for the uplink transmission in the zeroth frequency hopping period), $N_{hopping\_offset}=20$, and $N_{RB}^{Hopping}=106$. Details are as follows:

A start RB ($\tilde{RB}_{start}^1$) used for the uplink transmission in the first frequency hopping period is: (0+20) mod 106=20, that is, the RB #20.

A start RB ($\tilde{RB}_{start}^2$) used for the uplink transmission in the second frequency hopping period is: (20+20) mod 106=40, that is, an RB #40.

A start RB ($\tilde{RB}_{start}^2$) used for the uplink transmission in the third frequency hopping period is: (40+20) mod 106=60, that is, an RB #60.

A start RB ($\tilde{RB}_{start}^2$) used for the uplink transmission in the fourth frequency hopping period is: (60+20) mod 106=80, that is, the RB #80.

A start RB ($\tilde{RB}_{start}^2$) used for the uplink transmission in the fifth frequency hopping period is: (80+20) mod 106=100, that is, the RB #100.

A start RB ($\tilde{RB}_{start}^2$) used for the uplink transmission in the sixth frequency hopping period is: (100+20) mod 106=14, that is, an RB #14.

A start RB used for the uplink transmission in each subsequent frequency hopping period may be deduced by analogy. Details are not described again.

A resource block set used for the uplink transmission in the p$^{th}$ frequency hopping period is:

$$(\tilde{RB}_{start}^p + i \cdot N) \bmod N_{RB}^{Hopping}$$

Details are as follows:

Resource blocks used for the uplink transmission in the first frequency hopping period are: (20+{0}+{0, 1, 2}*10) mod 106={20, 30, 40}, that is, the RB #20, an RB #30, and the RB #40.

Resource blocks used for the uplink transmission in the second frequency hopping period are: (40+{0}+{0, 1, 2}*10) mod 106={40, 50, 60}, that is, the RB #40, an RB #50, and the RB #60.

Resource blocks used for the uplink transmission in the third frequency hopping period are: (60+{0}+{0, 1, 2}*10) mod 106={60, 70, 80}, that is, the RB #60, an RB #70, and the RB #80.

Resource blocks used for the uplink transmission in the fourth frequency hopping period are: (80+{0}+{0, 1, 2}*10) mod 106={80, 90, 100}, that is, the RB #80, the RB #90, and the RB #100.

Resource blocks used for the uplink transmission in the fifth frequency hopping period are: (100+{0}+{0, 1, 2}*10) mod 106={100, 4, 14}, that is, the RB #100, an RB #4, and the RB #14.

Resource blocks used for the uplink transmission in the sixth frequency hopping period are: (14+{0}+{0, 1, 2}*10) mod 106={14, 24, 34}, that is, the RB #14, an RB #24, and an RB #34.

As can be seen from this, the frequency hopping may be cyclic frequency hopping that is based on a total frequency hopping bandwidth (106 RBs).

Resource blocks used for the uplink transmission in each subsequent frequency hopping period may be deduced by analogy. Details are not described again.

Figure 13:
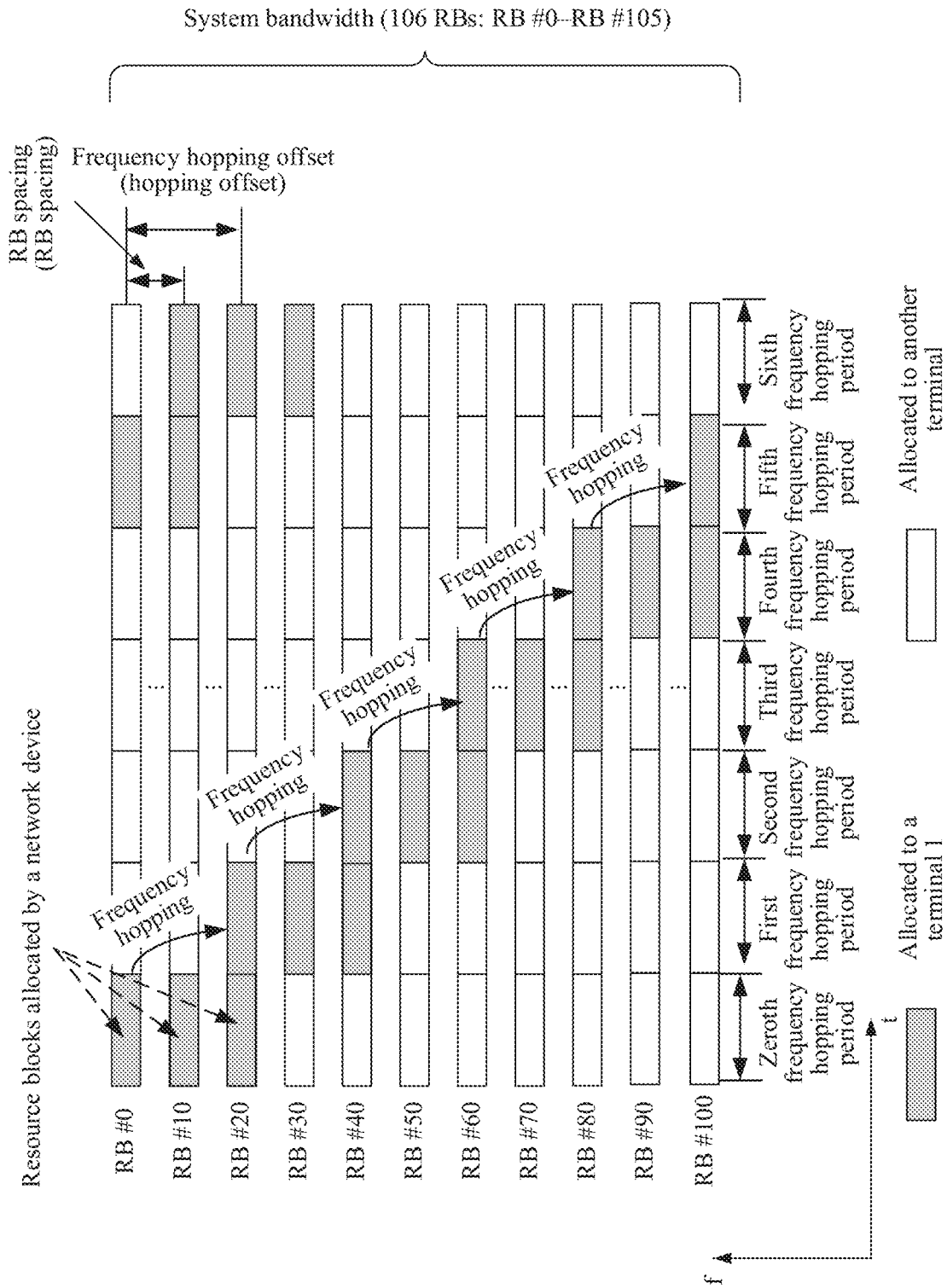
FIG. 13 is a schematic diagram of resources on which frequency hopping is performed in a system bandwidth according to still another embodiment of this application.

Optionally, as shown in FIG. 13, the frequency hopping may alternatively be cyclic frequency hopping that is based on the first resource set. In other words, an RB index of the second resource set used for the uplink transmission in each frequency hopping period cycles, based on the frequency hopping offset, among all RB indexes corresponding to the first resource set to which the second resource set belongs.

As can be seen from FIG. 13, through the frequency hopping, an accumulated bandwidth occupied by resource blocks (the RB #0, the RB #10, and the RB #20) allocated by the network device to the terminal in a specific time period (in the zeroth to the fourth frequency hopping periods is 91 RBs, and a bandwidth occupancy of the 91 RBs is: 90*0.18 M/20 M=81.9%. That is, the 91 RBs occupy more than 80% of the system bandwidth, meeting an OCB requirement. In addition, the network device does not need to use the entire interlace as a basic scheduling unit, thereby greatly reducing a resource scheduling granularity, and improving resource scheduling flexibility.

(2) Embodiment 2

A difference from Embodiment 1 is that a network device uses some nonconsecutive RBs in a first resource set as a basic scheduling unit. In other words, a second resource set allocated by a network device to a terminal includes an integer quantity of nonconsecutive resource blocks in the first resource set.

Specifically, the second resource set allocated by the network device to the terminal may be represented as: $RB_{START}+l+i\cdot N$, where $RB_{START}$ indicates an index of a start resource block allocated to the terminal; $l \in L$, the set L includes an index of the first resource set to which the second resource set belongs; N indicates a spacing between two adjacent RBs in the first resource set; and $i \in M$, where the set M includes an index, in the first resource set to which the second resource set belongs, of a resource block in the second resource set.

Specifically, when frequency hopping is performed, the second resource set allocated by the network device to the terminal periodically hops in frequency domain. A resource block set used for uplink transmission in a $p^{th}$ frequency hopping period may be represented as:

$$(\tilde{RB}_{start}^{p}+l+i\cdot N) \bmod N_{RB}^{Hopping}$$

where $\tilde{RB}_{start}^{p}$ indicates an index of a start RB used for the uplink transmission in the $p(p>1)^{th}$ frequency hopping period, $N_{RB}^{Hopping}$ indicates a total quantity of resource blocks that can be used for frequency hopping transmission, and the following is satisfied:

$$\tilde{RB}_{start}^{0}=RB_{START},$$

$$\tilde{RB}_{start}^{p}=(\tilde{RB}_{start}^{p-1}+N_{hopping\_offset}) \bmod N_{RB}^{Hopping}$$

where $\tilde{RB}_{start}^{p-1}$ indicates an index of a start RB used for the uplink transmission in a $(p-1)^{th}$ frequency hopping period, and $N_{hopping\_offset}$ is a frequency hopping offset.

Specific implementation of Embodiment 2 is described below by using FIG. 7 as an example.

Assumption 1: A system bandwidth is 20 MHz, a subcarrier spacing is 15 kHZ, and a transmission bandwidth is $N_{RB}^{UL}=100$ RB. The first resource set is an interlace including 10 RBs that are evenly distributed in frequency domain (for example, an RB #0, an RB #10, an RB #20, an RB #80, and an RB #90 in FIG. 7). Resource allocation starts from the RB 0 (that is, $RB_{START}=0$).

Assumption 2: The spacing (that is, an RB spacing) between two adjacent RBs in the first resource set is 10 RBs. The frequency hopping offset (hopping offset) is 20 RBs.

The second resource set allocated by the network device to the terminal is: $RB_{START}+l+i\cdot N$, where $RB_{START}=0$, $l \in L$, $L=\{0\}$, $i \in M$, $M=\{0,1,3\}$, and N=10. Therefore, the second resource set is:

0+{0}+{0,1,3}*10={0,10,30}

Figure 7:
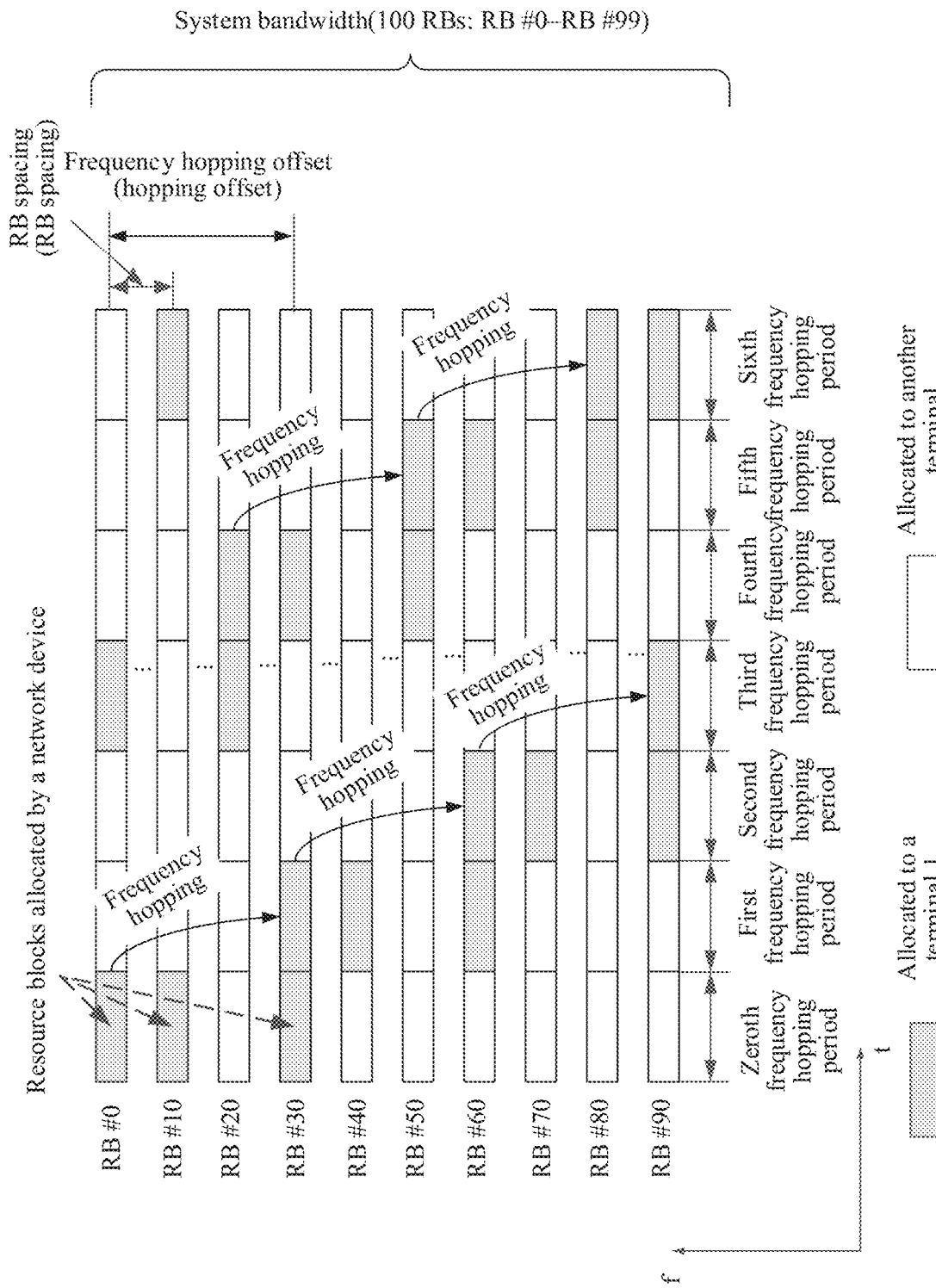
FIG. 7 is a schematic diagram of resources on which frequency hopping is performed in a system bandwidth according to another embodiment of this application.

Resource blocks indicated in the foregoing set are the RB #0, the RB #10, and an RB #30 in FIG. 7, and are resource blocks used for the uplink transmission in the zeroth frequency hopping period.

A start RB ($\tilde{RB}_{start}^{p}$) used for the uplink transmission in a $p(p>1)^{th}$ frequency hopping period is:

$$\tilde{RB}_{start}^{0}=RB_{START},$$

$$\tilde{RB}_{start}^{p}=(\tilde{RB}_{start}^{p-1}+N_{hopping\_offset}) \bmod N_{RB}^{Hopping}$$

where $RB_{START}=0$ (a start RB used for the uplink transmission in the zeroth frequency hopping period), $N_{hopping\_offset}=30$, and $N_{RB}^{Hopping}=100$. Details are as follows:

A start RB ($\tilde{RB}_{start}^{1}$) used for the uplink transmission in the first frequency hopping period is: (0+30) mod 100=30, that is, the RB #30.

A start RB ($\tilde{RB}_{start}^{2}$) used for the uplink transmission in the second frequency hopping period is: (30+30) mod 100=60, that is, an RB #60.

A start RB ($\tilde{RB}_{start}^{3}$) used for the uplink transmission in the third frequency hopping period is: (60+30) mod 100=90, that is, the RB #90.

A start RB used for the uplink transmission in each subsequent frequency hopping period may be deduced by analogy. Details are not described again.

A resource block set used for the uplink transmission in the $p^{th}$ frequency hopping period is:

$$(\tilde{RB}_{start}^{p}+l+i\cdot N) \bmod N_{RB}^{Hopping}$$

Details are as follows:

Resource blocks used for the uplink transmission in the first frequency hopping period are: (30+{01}+{0, 1, 3}*10) mod 100={30, 40, 60}, that is, the RB #30, an RB #40, and the RB #60.

Resource blocks used for the uplink transmission in the second frequency hopping period are: (60+{0}+{0, 1, 3}*10) mod 100={60, 70, 90}, that is, the RB #60, an RB #70, and the RB #90.

Resource blocks used for the uplink transmission in the third frequency hopping period are: (90+{0}+{0, 1, 3}*10) mod 100={90, 0, 20}, that is, the RB #90, the RB #0, and the RB #20. As can be seen from this, the frequency hopping may be cyclic frequency hopping that is based on a total frequency hopping bandwidth (100 RBs).

Resource blocks used for the uplink transmission in each subsequent frequency hopping period may be deduced by analogy. Details are not described again.

Specific implementation of Embodiment 2 is described below by using another example.

Assumption 1: A system bandwidth is 20 MHz, a subcarrier spacing is 15 kHZ, and a transmission bandwidth is 106 RBs. The first resource set is an interlace including 10 or 11 RBs that are evenly distributed in frequency domain (for example, an interlace #0 corresponds to 11 RBs: an RB #0, an RB #10, an RB #20, . . . , RB #80, an RB #90, and an RB

100, and an interlace #9 corresponds to 10 RBs: an RB #9, an RB #19, an RB #29, . . . , an RB #89, and an RB #99). Resource allocation starts from the RB 0 (that is, $RB_{START}=0$).

Assumption 2: The spacing (that is, an RB spacing) between two adjacent RBs in the first resource set is 10 RBs. The frequency hopping offset (hopping offset) is 20 RBs.

The second resource set allocated by the network device to the terminal is: $RB_{START}+l+i \cdot N$, where $RB_{START}=0$, $l \in L$, $L=\{0\}$, $i \in M$, $M=\{0,1,3\}$, and N=10. Therefore, the second resource set is:

$$0+\{0\}+\{0,1,3\}*10=\{0,10,30\}$$

Resource blocks indicated in the foregoing set are the RB #0, the RB #10, and an RB #30, and are resource blocks used for the uplink transmission in the zeroth frequency hopping period.

A start RB ($\tilde{R}B_{start}^p$) used for the uplink transmission in a $p(p>1)^{th}$ frequency hopping period is:

$$\tilde{R}B_{start}^0=RB_{START},$$

$$\tilde{R}B_{start}^p=(\tilde{R}B_{start}^{p-1}N_{hopping\_offset}) \bmod N_{RB}^{Hopping}$$

where $RB_{START}=0$ (a start RB used for the uplink transmission in the zeroth frequency hopping period), $N_{hopping\_offset}=30$, and $N_{RB}^{Hopping}=100$. Details are as follows:

A start RB ($\tilde{R}B_{start}^1$) used for the uplink transmission in the first frequency hopping period is: (0+30) mod 106=30, that is, the RB #30.

A start RB ($\tilde{R}B_{start}^2$) used for the uplink transmission in the second frequency hopping period is: (30+30) mod 106=60, that is, an RB #60.

A start RB ($\tilde{R}B_{start}^3$) used for the uplink transmission in the third frequency hopping period is: (60+30) mod 106=90, that is, the RB #90.

A start RB ($\tilde{R}B_{start}^2$) used for the uplink transmission in the fourth frequency hopping period is: (90+30) mod 106=14, that is, an RB #14.

A start RB ($\tilde{R}B_{start}^2$) used for the uplink transmission in the fifth frequency hopping period is: (14+30) mod 106=44, that is, an RB #44.

A start RB ($\tilde{R}B_{start}^2$) used for the uplink transmission in the sixth frequency hopping period is: (34+30) mod 106=64, that is, an RB #64.

A start RB used for the uplink transmission in each subsequent frequency hopping period may be deduced by analogy. Details are not described again.

A resource block set used for the uplink transmission in the $p^{th}$ frequency hopping period is:

$$(\tilde{R}B_{start}^p+l+i \cdot N) \bmod N_{RB}^{Hopping}$$

Details are as follows:

Resource blocks used for the uplink transmission in the first frequency hopping period are: (30+{0}+{0, 1, 3}*10) mod 106={30, 40, 60}, that is, the RB #30, an RB #40, and the RB #60.

Resource blocks used for the uplink transmission in the second frequency hopping period are: (60+{0}+{0, 1, 3}*10) mod 106={60, 70, 90}, that is, the RB #60, an RB #70, and the RB #90.

Resource blocks used for the uplink transmission in the third frequency hopping period are: (90+{0}+{0, 1, 3}*10) mod 106={90, 0, 20}, that is, the RB #90, the RB #100, and the RB #14.

Resource blocks used for the uplink transmission in the fourth frequency hopping period are: (14+{0}+{0, 1, 3}*10) mod 106={14, 24, 44}, that is, the RB #14, an RB #24, and the RB #44.

Resource blocks used for the uplink transmission in the fifth frequency hopping period are: (44+{0}+{0, 1, 3}*10) mod 106={4, 54, 74}, that is, the RB #44, an RB #54, and an RB #74.

Resource blocks used for the uplink transmission in the sixth frequency hopping period are: (74+{0}+{0, 1, 3}*10) mod 106={74, 84, 104}, that is, the RB #74, an RB #84, and an RB #104.

As can be seen from this, the frequency hopping may be cyclic frequency hopping that is based on a total frequency hopping bandwidth (106 RBs). Resource blocks used for the uplink transmission in each subsequent frequency hopping period may be deduced by analogy. Details are not described again.

Optionally, the frequency hopping may alternatively be cyclic frequency hopping that is based on the first resource set. To be specific, an RB index of the second resource set used for the uplink transmission in each frequency hopping period cycles, based on the frequency hopping offset, among all RB indexes corresponding to the first resource set to which the second resource set belongs.

As can be seen from FIG. 7, through the frequency hopping, an accumulated bandwidth occupied by resource blocks (the RB #0, the RB #10, and the RB #30) allocated by the network device to the terminal in a specific time period (in the zeroth to the third frequency hopping periods) is 91 RBs, and a bandwidth occupancy of the 91 RBs is: 90*0.18 M/20 M=81.9%. That is, the 91 RBs occupy more than 80% of the system bandwidth, meeting an OCB requirement. In addition, the network device does not need to use the entire interlace as a basic scheduling unit, thereby greatly reducing a resource scheduling granularity, and improving resource scheduling flexibility.

(3) Embodiment 3

In this embodiment, a system bandwidth is divided into a plurality of first resource sets, and the first resource set includes a plurality of RBs that are evenly distributed in the entire system bandwidth. Optionally, the first resource set may use an interlace structure in eLAA. During resource allocation, a network device uses some RBs in the plurality of first resource sets as a basic scheduling unit. In other words, a second resource set allocated by the network device to a terminal includes an integer quantity of resource blocks in at least two first resource sets.

Specifically, the second resource set allocated by the network device to the terminal may be represented as: $RB_{START}+l+i \cdot N$, where $RB_{START}$ indicates an index of a start resource block allocated to the terminal; $l \in L$, where the set L includes an index of the first resource set to which the second resource set belongs; N indicates a spacing between two adjacent RBs in the first resource set; and $i \in M$, where the set M includes an index, in the first resource set to which the second resource set belongs, of a resource block in the second resource set.

Specifically, when frequency hopping is performed, the second resource set allocated by the network device to the terminal periodically hops in frequency domain. A resource block set used for uplink transmission in a $p^{th}$ frequency hopping period may be represented as:

$$(\tilde{R}B_{start}^p+l+i \cdot N) \bmod N_{RB}^{Hopping}$$

where $\tilde{RB}_{start}^{p}$ indicates index of a start RB used for the uplink transmission in the $p(p>1)^{th}$ frequency hopping period, and $N_{RB}^{Hopping}$ indicates a total quantity of resource blocks that can be used for frequency hopping transmission. And the following is satisfied:

$$\tilde{RB}_{start}^{0}=RB_{START},$$

$$(\tilde{RB}_{start}^{p}=(\tilde{RB}_{start}^{p-1}+N_{hopping\_offset})\bmod N_{RB}^{Hopping}$$

where $\tilde{RB}_{start}^{p-1}$ indicates an index of a start RB used for the uplink transmission in a $(p-1)^{th}$ frequency hopping period, and $N_{hopping\_offset}$ is a frequency hopping offset.

Specific implementation of Embodiment 3 is described below by using FIG. 8 as an example.

Assumption 1: The system bandwidth is 20 MHz, a subcarrier spacing is 15 kHZ, and a transmission bandwidth is $N_{RB}^{UL}=100$ RB. The first resource set is an interlace including 10 RBs that are evenly distributed in frequency domain (such as an interlace #0 (an RB #0, an RB #10, an RB #20, . . . , an RB #80, and an RB #90) and an interlace #1 (an RB #1, an RB #11, an RB #21, . . . , an RB #81, and an RB #91) in FIG. 8). Resource allocation starts from the RB 0 (that is, $RB_{START}=0$).

Assumption 2: The spacing (that is, an RB spacing) between two adjacent RBs in the first resource set is 10 RBs. The frequency hopping offset (hopping offset) is 20 RBs.

The second resource set allocated by the network device to the terminal is: $RB_{START}+l+i\cdot N$, where $RB_{START}=0$, $l\in L$, $L=\{0,1\}$, $i\in M$, $M=\{0,1,2\}\&\{0,1\}$, and $N=10$. Therefore, the second resource set is:

$$0+\{0,1\}+\{0,1,2\}\&\{0,1\}*10=\{0,10,20\}\&\{1,11\}$$

Figure 8:
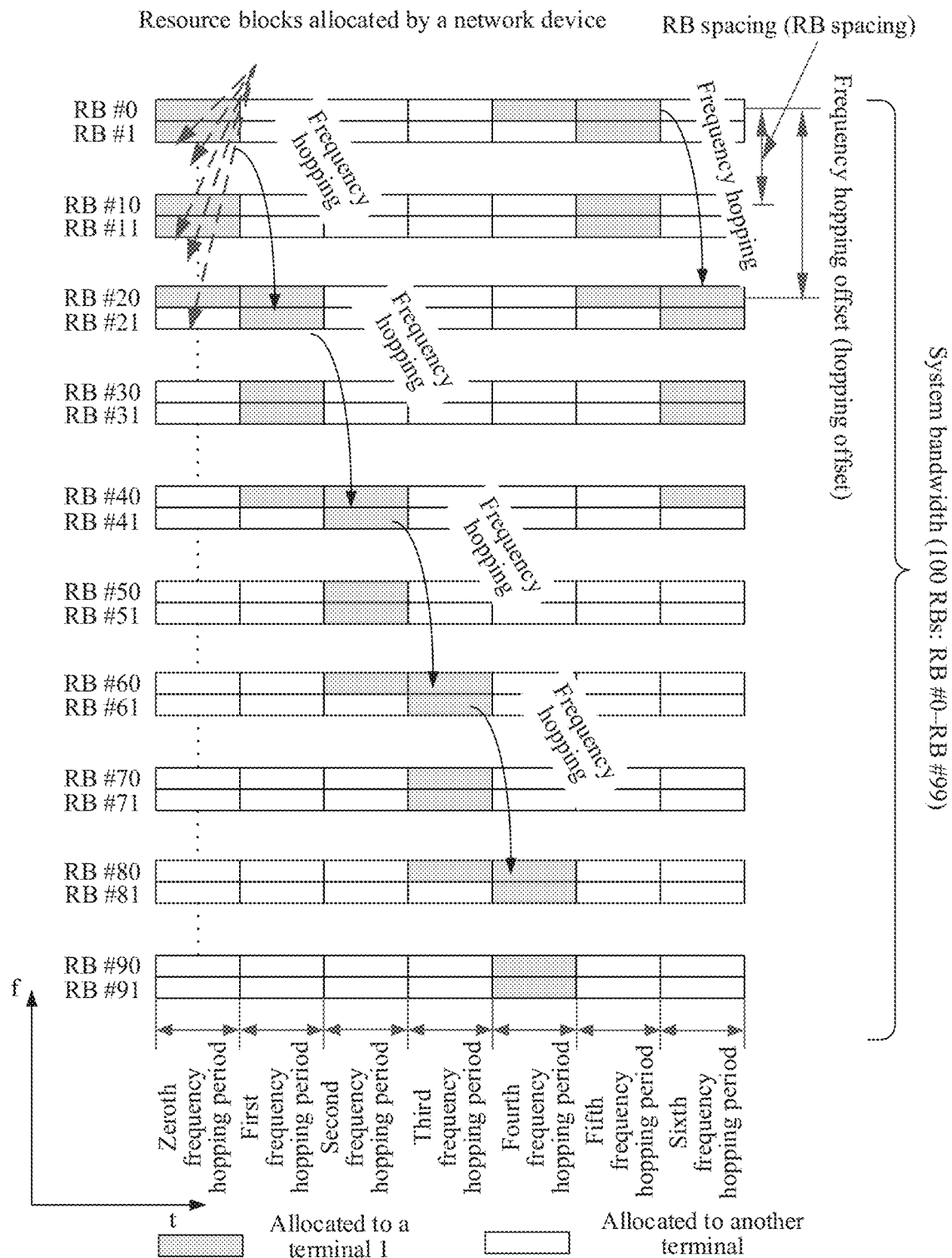
FIG. 8 is a schematic diagram of resources on which frequency hopping is performed in a system bandwidth according to still another embodiment of this application.

The foregoing two sets respectively indicate the RB #0, the RB #10, and the RB #20 in the interlace #0 and the RB #1 and the RB #11 in the interlace #1 in FIG. 8.

A start RB ($\tilde{RB}_{start}^{p}$) used for the uplink transmission in a $p(p>1)^{th}$ frequency hopping period is:

$$\tilde{RB}_{start}^{0}=RB_{START},$$

$$\tilde{RB}_{start}^{p}=(\tilde{RB}_{start}^{p-1}+N_{hopping\_offset})\bmod N_{RB}^{Hopping}$$

where $RB_{START}=0$ (a start RB used for the uplink transmission in the zeroth frequency hopping period), $N_{hopping\_offset}=20$, and $N_{RB}^{Hopping}=100$. Details are as follows:

A start RB ($\tilde{RB}_{start}^{1}$) used for the uplink transmission in the first frequency hopping period is: (0+20) mod 100=30, that is, the RB #20.

A start RB ($\tilde{RB}_{start}^{2}$) used for the uplink transmission in the second frequency hopping period is: (20+20) mod 100=40, that is, an RB #40.

A start RB used for the uplink transmission in each subsequent frequency hopping period may be deduced by analogy. Details are not described again.

A resource block set used for the uplink transmission in the $p^{th}$ frequency hopping period is:

$$(\tilde{RB}_{start}^{p}+l+i\cdot N)\bmod N_{RB}^{Hopping}$$

Details are as follows:

Resource blocks used for the uplink transmission in the first frequency hopping period are: $(20+\{0, 1, 2\}\&\{0, 1\}*10)\bmod 100=\{20, 30, 40\}\&\{21, 31\}$, that is, the RB #20, an RB #30, and the RB #40, and the RB #21 and an RB #31.

Resource blocks used for the uplink transmission in the second frequency hopping period are: $(40+\{0, 1, 2\}\&\{0, 1\}*10)\bmod 100=\{40, 50, 60\}\&\{41, 51\}$, that is, the RB #40, an RB #50, and an RB #60, and an RB #41 and an RB #51.

Resource blocks used for the uplink transmission in each subsequent frequency hopping period may be deduced by analogy. Details are not described again.

Specific implementation of Embodiment 3 is described below by using another example.

Assumption 1: The system bandwidth is 20 MHz, a subcarrier spacing is 15 kHZ, and a transmission bandwidth is 106 RBs. The first resource set is an interlace including 10 or 11 RBs that are evenly distributed in frequency domain (for example, an interlace #0 corresponds to 11 RBs: an RB #0, an RB #10, an RB #20, . . . , an RB #80, an RB #90, and an RB #100, and an interlace #9 corresponds to 10 RBs: an RB #9, an RB #19, an RB #29, . . . , an RB #89, and an RB #99). Resource allocation starts from the RB 0 (that is, $RB_{START}=0$).

Assumption 2: The spacing (that is, an RB spacing) between two adjacent RBs in the first resource set is 10 RBs. The frequency hopping offset (hopping offset) is 20 RBs.

The second resource set allocated by the network device to the terminal is: $RB_{START}+l+i\cdot N$, where $RB_{START}=0$, $l\in L$, $L=\{0,1\}$, $i\in M$, $M=\{0,1,2\}\&\{0,1\}$, and $N=10$. Therefore, the second resource set is:

$$0+\{0,1\}+\{0,1,2\}\&\{0,1\}*10=\{0,10,20\}\&\{1,11\}$$

The foregoing two sets respectively indicate the RB #0, the RB #10, and the RB #20 in the interlace #0 and an RB #1 and an RB #11 in an interlace #1.

A start RB ($\tilde{RB}_{start}^{p}$) used for the uplink transmission in a $p(p>1)^{th}$ frequency hopping period is:

$$\tilde{RB}_{start}^{0}=RB_{START},$$

$$\tilde{RB}_{start}^{p}=(\tilde{RB}_{start}^{p-1}+N_{hopping\_offset})\bmod N_{RB}^{Hopping}$$

where $RB_{START}=0$ (a start RB used for the uplink transmission in the zeroth frequency hopping period), $N_{hopping\_offset}=20$, and $N_{RB}^{Hopping}=106$. Details are as follows:

A start RB ($\tilde{RB}_{start}^{1}$) used for the uplink transmission in the first frequency hopping period is: (0+20) mod 106=30, that is, the B #20.

A start RB ($\tilde{R}_{start}^{2}$) used for the uplink transmission in the second frequency hopping period is: (20+20) mod 106=40, that is, an RB #40.

A start RB ($\tilde{RB}_{start}^{2}$) used for the uplink transmission in the third frequency hopping period is: (40+20) mod 106=60, that is, an RB #60.

A start RB ($\tilde{RB}_{start}^{2}$) used for the uplink transmission in the fourth frequency hopping period is: (60+20) mod 106=80, that is, the RB #80.

A start RB ($\tilde{RB}_{start}^{2}$) used for the uplink transmission in the fifth frequency hopping period is: (80+20) mod 106=100, that is, the RB #100.

A start RB ($\tilde{RB}_{start}^{2}$) used for the uplink transmission in the sixth frequency hopping period is: (100+20) mod 106=14, that is, an RB #14.

A start RB used for the uplink transmission in each subsequent frequency hopping period may be deduced by analogy. Details are not described again.

A resource block set used for the uplink transmission in the $p^{th}$ frequency hopping period is:

$$(\tilde{RB}_{start}^{p}+l+i\cdot N)\bmod N_{RB}^{Hopping}$$

Details are as follows:

Resource blocks used for the uplink transmission in the first frequency hopping period are: $(20+\{0, 1\}+\{0, 1,$ 2}&{0, 1}*10) mod 106={20, 30, 40}&{21, 31}, that is, the RB #20, an RB #30, and the RB #40, and an RB #21 and an RB #31.

Resource blocks used for the uplink transmission in the second frequency hopping period are: (40+{0, 1}+{0, 1, 2}&{0, 1}*10) mod 106={40, 50, 60}&{41, 51}, that is, the RB #40, an RB #50, and the RB #60, and an RB #41 and an RB #51.

Resource blocks used for the uplink transmission in the third frequency hopping period are: (60+{0, 1}+{0, 1, 2}&{0, 1}*10) mod 106={60, 70, 80}&{61, 71}, that is, the RB #60, an RB #70, and the RB #80, and an RB #61 and an RB #71.

Resource blocks used for the uplink transmission in the fourth frequency hopping period are: (80+{0, 1}+{0, 1, 2}&{0, 1}*10) mod 106={80, 90, 100}}&{81, 91}, that is, the RB #80, the RB #90, and the RB #100, and an RB #81 and an RB #91.

Resource blocks used for the uplink transmission in the fifth frequency hopping period are: (100+{0, 1}+{0, 1, 2}&{0, 1}*10) mod 106={100, 4, 14}&{101, 5}, that is, the RB #100, an RB #4, and the RB #14, and an RB #101 and an RB #5.

Resource blocks used for the uplink transmission in the sixth frequency hopping period are: (14+{0, 1}+{0, 1, 2}&{0, 1}*10) mod 106={14, 24, 34}&{15, 25}, that is, the RB #14, an RB #24, and an RB #34, and the RB #101 and the RB #5.

As can be seen from this, the frequency hopping may be cyclic frequency hopping that is based on a total frequency hopping bandwidth (106 RBs). Resource blocks used for the uplink transmission in each subsequent frequency hopping period may be deduced by analogy. Details are not described again.

Optionally, the frequency hopping may alternatively be cyclic frequency hopping that is based on the first resource set. In other words, an RB index of the second resource set used for the uplink transmission in each frequency hopping period cycles, based on the frequency hopping offset, among all RB indexes corresponding to the first resource set to which the second resource set belongs.

As can be seen from FIG. 8, through the frequency hopping, an accumulated bandwidth occupied by resource blocks (the RB #0, the RB #10, and the RB #20 in the interlace #0, and the RB #1 and the RB #11 in the interlace #1) allocated by the network device to the terminal in a specific time period (in the zeroth to the fourth frequency hopping periods) is 91 RBs, and a bandwidth occupancy of the 91 RBs is: 90*0.18 M/20 M=81.9%. That is, the 91 RBs occupy more than 80% of the system bandwidth, meeting an OCB requirement. In addition, the network device does not need to use the entire interlace as a basic scheduling unit, thereby greatly reducing a resource scheduling granularity, and improving resource scheduling flexibility.

In the foregoing three embodiments, the first resource set is an integer quantity of resource blocks that are evenly distributed in the entire system bandwidth. A resource structure of the integer quantity of resource blocks may be related to the system bandwidth and/or the subcarrier spacing.

In some embodiments of this application, to adapt to scenarios with a plurality of system bandwidths and/or a plurality of subcarrier spacings, the first resource sets may include H resource blocks. H is a positive integer, and H is divisible by a total quantity of resource blocks that corresponds to each of a plurality of transmission bandwidths corresponding to an unlicensed frequency band.

The following uses an example for description.

First, the 5 GHz frequency band is used as an example. For a future new radio (NR) communications technology, system bandwidths that can be supported include 20 MHz, 40 MHz, 80 MHz, 160 MHz, and the like, and selectable subcarrier spacings include 15 kHz, 60 kHz, and the like.

I. For the 15 kHz subcarrier spacing, transmission bandwidths corresponding to the foregoing system bandwidth scenarios may respectively be 100 RBs, 200 RBs, 400 RBs, and 800 RBs. The following several resource interlace (interlace) structures may be compatible with the foregoing system bandwidth scenarios:

(1) Each resource interlace includes 10 RBs. In the foregoing system bandwidth scenarios, bandwidths occupied by one resource interlace are respectively 91 RBs, 181 RBs, 361 RBs, and 721 RBs.

(2) Each resource interlace includes 25 RBs. In the foregoing system bandwidth scenarios, bandwidths occupied by one resource interlace are respectively 97 RBs, 193 RBs, 385 RBs, and 769 RBs.

It may be understood that, for the 15 KHz subcarrier spacing, quantities of resource blocks included in the two types of resource interlaces in (1) and (2) can be exactly divided by a total quantity of resource blocks corresponding to the foregoing system bandwidths.

II. For the 60 kHz subcarrier spacing, transmission bandwidths corresponding to the foregoing system bandwidth scenarios may respectively be 25 RBs, 50 RBs, 100 RBs, and 200 RBs. A resource interlace (interlace) structure that is compatible with the foregoing system bandwidth scenarios may be as follows: Each resource interlace includes 25 RBs. In the foregoing system bandwidth scenarios, bandwidths occupied by one resource interlace are respectively 25 RBs, 49 RBs, 97 RBs, and 193 RBs.

In conclusion, uplink resources in the 5 GHz frequency band may be allocated in the following two solutions:

(1) To be compatible with all scenarios (with the 15 kHz or 60 kHz subcarrier spacing), a fixed 25 RBs/interlace solution (that is, each resource interlace includes 25 RBs) may be used.

(2) To adapt to various service requirements, both of the two structures, 10 RBs/interlace and 25 RBs/interlace, may be supported. When resource allocation is indicated, type information (10 RBs/interlace or 25 RBs/interlace) of an interlace further needs to be carried in resource indication information.

In other words, in the 5 GHz frequency band, the second resource set allocated to the terminal may include some RBs in a plurality of resource interlaces with different structures.

It should be noted that the foregoing example analysis of the 5 GHz frequency band is used to merely explain the embodiments of this application, and actual values of specific parameters such as the transmission bandwidth and the subcarrier spacing in the foregoing system bandwidth scenarios are all subject to definitions in future standards.

Then, the 60 GHz frequency band is used as an example. For a future new radio (NR) communications technology, system bandwidths that can be supported include 500 MHz, 1 GHz, 2 GHz, and the like, and selectable subcarrier spacings include 480 kHz, 960 kHz (only supported when the system bandwidth is 2 GHz), and the like.

I. For the 480 kHz subcarrier spacing, transmission bandwidths corresponding to the foregoing system bandwidth scenarios may respectively be 78 RBs, 156 RBs, and 312 RBs. A resource interlace (interlace) structure that is compatible with the foregoing system bandwidth scenarios may be as follows: Each resource interlace includes six RBs. In the foregoing system bandwidth scenarios, bandwidths occupied by one resource interlace are respectively 66 RBs, 131 RBs, and 261 RBs.

II. For the 960 kHz subcarrier spacing, a transmission bandwidth corresponding to the 2 GHz system bandwidth may be 156 RBs. A resource interlace (interlace) structure that adapts to the 2 GHz system bandwidth scenario may be as follows: Each resource interlace includes six RBs. In the 2 GHz system bandwidth scenario, a bandwidth occupied by one resource interlace is 131 RBs.

In conclusion, uplink resources in the 60 GHz frequency band may be allocated by using a fixed 6 RBs/interlace (that is, each resource interlace includes six RBs) solution.

It should be noted that the foregoing example analysis of the 60 GHz frequency band is used to merely explain the embodiments of this application, and actual values of specific parameters such as the transmission bandwidth and the subcarrier spacing in the foregoing system bandwidth scenarios are all subject to definitions in future standards.

In some embodiments of this application, to support resource alignment between different bandwidths, the RB spacing (RB spacing) in the first resource set may be a fixed value. Herein, the RB spacing is a spacing between any two adjacent RBs in the first resource set.

For example, in bandwidths such as 20 MHz, 40 MHz, 80 MHz, and 120 MHz, an RB spacing N of each resource interlace is 10. In this way, when an accessible bandwidth detected by the terminal through LBT is inconsistent with a bandwidth scheduled by the network device, the terminal may alternatively perform the uplink transmission without waiting for the network device to perform resource scheduling again, thereby implementing flexible bandwidth transmission.

In this application, a plurality of first resource sets (for example, an interlace) in the system bandwidth (or the subband) may use a same resource structure, or may use different resource structures. Herein, the resource structure mainly refers to at least one, in the first resource set (for example, the interlace), of a quantity of resource blocks or a spacing between adjacent resource blocks.

Without being limited to the foregoing three embodiments, the first resource set may alternatively be an integer quantity of resource blocks that are evenly distributed in a single subband. Descriptions are provided below by using the embodiments of FIG. 9 and FIG. 10.

(4) Embodiment 4

In this embodiment, a system bandwidth is divided into a plurality of subbands. Resource allocation in each subband may be independent or the same. During the resource allocation, a network device uses some RBs in a first resource set in a same subband as a basic scheduling unit. In other words, a second resource set allocated by the network device to a terminal may include some resource blocks in at least one first resource set in a same subband.

Specifically, the second resource set allocated by the network device to the terminal may be represented as: $RB_{START}+l+i \cdot N$, where $RB_{START}$ indicates an index of a start resource block allocated to the terminal; $l \in L$, where the set L includes an index of the first resource set to which the second resource $l \in L$, set in a single subband belongs; N indicates a spacing between two adjacent RBs in the first resource set; and $i \in M$, where the set M includes an index, in the first resource set to which the second resource set belongs, of a resource block allocated to the terminal in the single subband.

Specifically, when frequency hopping is performed, the second resource set that is allocated by the network device to the terminal in the single subband periodically hops in the subband. A resource block set used for the uplink transmission in a $p^{th}$ frequency hopping period may be represented as:

$$[(\tilde{RB}_{start}^{p}+l+i \cdot N) \bmod N_{RB}^{SB}]+kN_{RB}^{SB}$$

where $\tilde{RB}_{start}^{p}$ indicates an index of a start RB used for the uplink transmission in the $p(p>1)^{th}$ frequency hopping period; $N_{RB}^{SB}$ indicates a bandwidth of the subband; and $k \in K$, where the set K includes an index of a subband to which the second resource set belongs. And the following is satisfied:

$$\tilde{RB}_{start}^{0}=RB_{START},$$

$$\tilde{RB}_{start}^{p}=[(\tilde{RB}_{start}^{p-1}+N_{hopping\_offset}) \bmod N_{RB}^{SB}]+k_{RB}^{SB}$$

where $\tilde{RB}_{start}^{p-1}$ indicates an index of a start RB used for the uplink transmission in a $(p-1)^{th}$ frequency hopping period, and $N_{hopping\_offset}$ is a frequency hopping offset.

Specific implementation of Embodiment 4 is described below by using FIG. 9 as an example.

Assumption 1: The system bandwidth is 40 MHz, and a subcarrier spacing is 15 kHZ. A transmission bandwidth is $N_{RB}^{UL}=200$ RB, and includes two 20 MHz subbands, and a bandwidth of each subband $N_{RB}^{SB}=100$ RB. The first resource set in each subband is an interlace including 10 RBs that are evenly distributed in frequency domain (as shown in FIG. 9, an interlace #0 in a subband #0 includes an RB #0, an RB #10, an RB #20, ..., an RB #80, and an RB #90, and an interlace #0 in a subband #1 includes an RB #100, an RB #110, an RB #120, ..., an RB #180, and an RB #190.

Assumption 2: The spacing (that is, an RB spacing) between two adjacent RBs in the first resource set in each subband is 10 RBs. A frequency hopping offset (hopping offset) in the subband #0 is 20 RBs, and a frequency hopping offset (hopping offset) in the subband #1 is 30 RBs. Resource allocation in the subband #0 starts from the RB #0 (that is, $RB_{START}=0$). Resource allocation in the subband #1 starts from the RB #100 (that is, $RB_{START}=100$).

A second resource set allocated by the network device to a terminal 1 is: $RB_{START}+l+i \cdot N$, where $RB_{START}=0$, $l \in L$, $L=\{0\}$, $i \in M$, $M=\{0,1\}$, and $N=10$. Therefore, the second resource set is:

$$0+\{0\}+\{0,1\}*10=\{0,10\}$$

Figure 9:
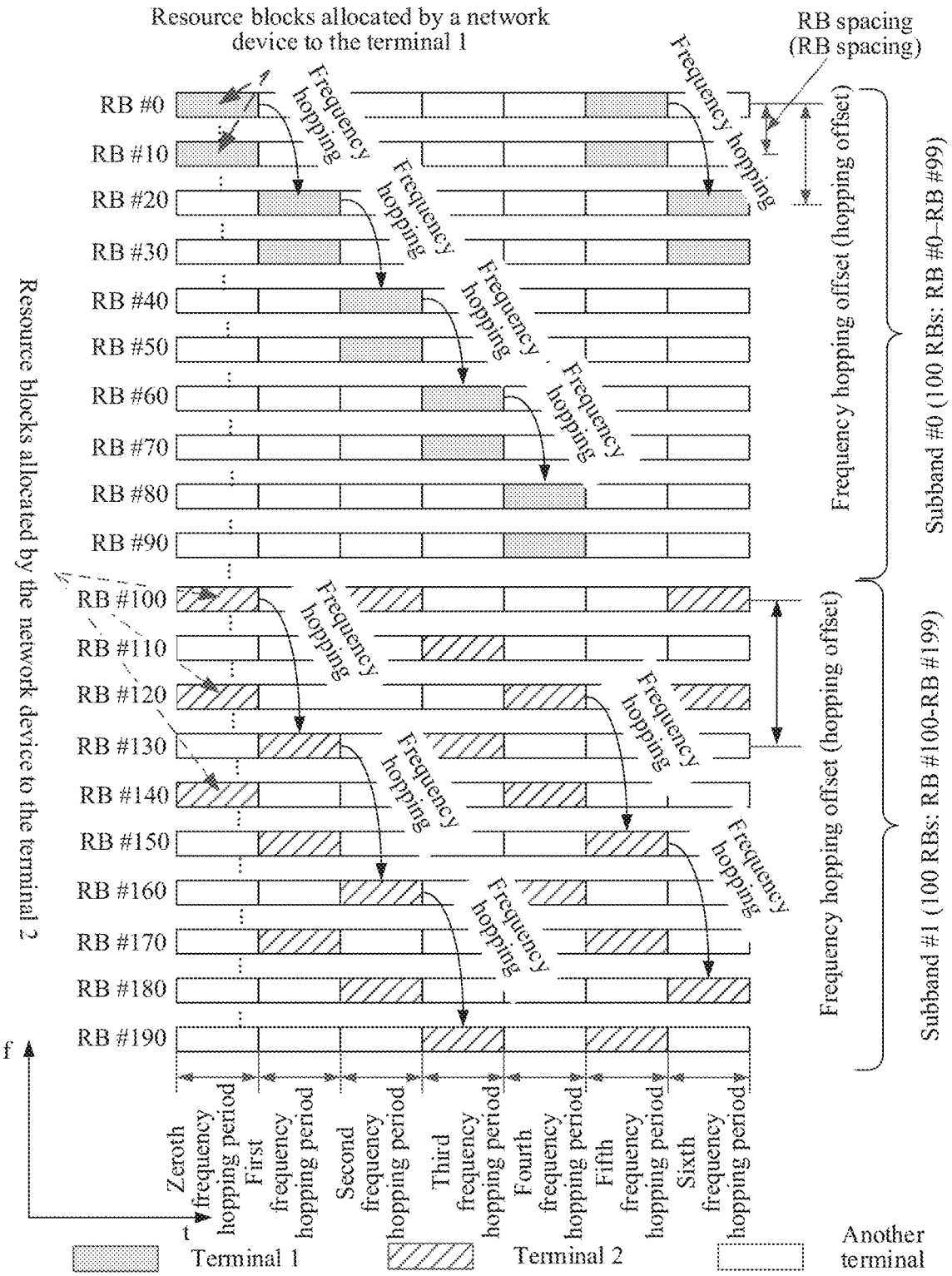
FIG. 9 is a schematic diagram of resources on which frequency hopping is performed in a subband according to still another embodiment of this application.

Resource blocks indicated in the foregoing set are the RB #0 and the RB #10 in FIG. 9, and are resource blocks used by the terminal 1 for the uplink transmission in the zeroth frequency hopping period in the subband #0.

For the terminal a start RB ($\tilde{RB}_{start}^{p}$) used for the uplink transmission in a $p(p>1)^{th}$ frequency hopping period is:

$$\tilde{RB}_{start}^{0}=RB_{START},$$

$$\tilde{RB}_{start}^{p}=[(\tilde{RB}_{start}^{p-1}+N_{hopping\_offset}) \bmod N_{RB}^{SB}]+kN_{RB}^{SB}$$

where $RB_{START}=0$ (a start RB used for the uplink transmission in the zeroth frequency hopping period in the subband #0), $N_{hopping\_offset}=20$, $N_{RB}^{SB}=100$, and k=0. Details are as follows:

A start RB ($\tilde{RB}_{start}^{1}$) used for the uplink transmission in the first frequency hopping period is: (0+20) mod 100=20, that is, the RB #20.

A start RB ($\tilde{RB}_{start}^{2}$) used for the uplink transmission in the second frequency hopping period is: (20+20) mod 100=40, that is, an RB #40.

A start RB used for the uplink transmission in each subsequent frequency hopping period may be deduced by analogy. Details are not described again.

For the terminal 1, a resource block set used for the uplink transmission in the $p^{th}$ frequency hopping period is:

$$[\tilde{R}B_{start}^{p}+i\cdot N)\bmod N_{RB}^{SB}]+kN_{RB}^{SB}$$

Details are as follows:

Resource blocks used for the uplink transmission in the first frequency hopping period are: $(20+\{0\}+\{0, 1\}*10) \bmod 100=\{20, 30\}$, that is, the RB #20 and an RB #30.

Resource blocks used for the uplink transmission in the second frequency hopping period are: $(40+\{0\}+\{0, 1\}*10) \bmod 100=\{40, 50\}$, that is, the RB #40 and an RB #50.

Resource blocks used by the terminal 1 for the uplink transmission in each subsequent frequency hopping period may be deduced by analogy. Details are not described again.

Similarly, the following may be deduced:

A second resource set allocated by the network device to a terminal 2 is: $RB_{START}+l+i\cdot N$, where $RB_{START}=100$, $i\in L$, $L=\{0\}$, $i\in M$, $M=\{0,2,4\}$, and $N=10$. Therefore, the second resource set is:

$$100+\{0\}+\{0,2,4\}*10=\{100,120,140\}$$

Resource blocks indicated in the foregoing set are the RB #100, the RB #120, and an RB #140 in FIG. 9, and are resource blocks used by the terminal 2 for the uplink transmission in the zeroth frequency hopping period in the subband #1.

For the terminal 2, $RB_{START}=100$ (a start RB used for the uplink transmission in the zeroth frequency hopping period in the subband #1) $N_{hopping\_offset}=30$, $N_{RB}^{SB}=100$, and $k=1$. Details are as follows:

A start RB ($\tilde{R}_{start}^{1}$) used for the uplink transmission in the first frequency hopping period is: $(100+30) \bmod 100+100=130$, that is, an RB #130.

A start RB ($\tilde{R}B_{start}^{2}$) used for the uplink transmission in the second frequency hopping period is: $(130+30) \bmod 100+100=160$, that is, an RB #160.

A start RB used for the uplink transmission in each subsequent frequency hopping period may be deduced by analogy. Details are not described again.

For the terminal 2, a resource block set used for the uplink transmission in the first frequency hopping period is: $(130+\{0\}+\{0, 2, 4\}*10) \bmod 100+100=\{130, 150, 170\}$, that is, the RB #130, an RB #150, and an RB #170.

For the terminal 2, a resource block set used for the uplink transmission in the second frequency hopping period is: $(160+\{0\}+\{0, 2, 4\}*10) \bmod 100+100=\{160, 180, 100\}$, that is, the RB #160, the RB #180, and the RB #100. As can be seen from this, the frequency hopping may be cyclic frequency hopping that is based on that a subband is a total frequency hopping bandwidth.

Resource blocks used by the terminal 2 for the uplink transmission in each subsequent frequency hopping period may be deduced by analogy. Details are not described again.

As can be seen from FIG. 9, through the frequency hopping, an accumulated bandwidth occupied by resource blocks (for example, the RB #0 and the RB #10 in the interlace #0 in the subband #0) allocated by the network device to each terminal in the subband in a specific time period (in the zeroth to the fourth frequency hopping periods) is 91 RBs, and a bandwidth occupancy of the 91 RBs is: 90*0.18 M/20 M=81.9%. That is, the 91 RBs occupy more than 80% of the single subband, meeting an OCB requirement. In addition, a resource scheduling granularity is greatly reduced, and resource scheduling flexibility is improved.

(5) Embodiment 5

In this embodiment, a system bandwidth is divided into a plurality of subbands. Resource allocation in each subband may be independent or the same. During the resource allocation, a network device uses some RBs in a first resource set in different subbands as a basic scheduling unit. In other words, a second resource set allocated by the network device to a terminal may include some resource blocks in at least one first resource set in different subbands.

Specifically, in a single subband, the second resource set allocated by the network device to the terminal may be represented as: $RB_{START}+l+i\cdot N$, where $RB_{START}$ indicates an index of a start resource block allocated by the network device to the terminal in the single subband; $l\in L$, where the set L includes an index of the first resource set to which the second resource set in the single subband belongs; N indicates a spacing between two adjacent RBs in the first resource set; and $i\in M$, where the set M includes an index, in the first resource set to which the second resource set belongs, of a resource block allocated to the terminal in the single subband.

Specifically, when frequency hopping is performed, the second resource set allocated by the network device to the terminal in the single subband periodically hops in the subband. A resource block set used for uplink transmission in a $p^{th}$ frequency hopping period may be represented as:

$$[(\tilde{R}B_{start}^{p}+l+i\cdot N)\bmod N_{RB}^{SB}]+kN_{RB}^{SB}$$

where $\tilde{R}B_{start}^{p}$ indicates an index of a start RB used for the uplink transmission in the $p(p>1)^{th}$ frequency hopping period in the single subband; $N_{RB}^{SB}$ indicates a bandwidth of the subband; and $k\in K$, where the set K includes an index of the subband to which the second resource set belongs. And the following is satisfied:

$$\tilde{R}B_{start}^{0}=RB_{START},$$

$$\tilde{R}B_{start}^{p}=[(\tilde{R}B_{start}^{p-1}+N_{hopping\_offset})\bmod N_{RB}^{SB}]+kN_{RB}^{SB}$$

where $\tilde{R}B_{start}^{p-1}$ indicates an index of a start RB used for the uplink transmission in a $(p-1)^{th}$ frequency hopping period in the single subband, and $N_{hopping\_offset}$ is a frequency hopping offset.

Specific implementation of Embodiment 5 is described below by using FIG. 10 as an example.

Assumption 1: The system bandwidth is 40 MHz, and a subcarrier spacing is 15 kHZ. A transmission bandwidth is $N_{RB}^{UL}=200$ RB, and includes two 20 MHz subbands, and a bandwidth of each subband $N_{RB}^{SB}$ 100 RB. The first resource set in each subband is an interlace including 10 RBs that are evenly distributed in frequency domain (as shown in FIG. 10, an interlace #0 in a subband #0 includes an RB #0, an RB #10, an RB #20, . . . , an RB #80, and an RB #90, and an interlace #0 in a subband #1 includes an RB #100, an RB #110, an RB #120, . . . , an RB #180, and an RB #190.

Assumption 2: The spacing (that is, an RB spacing) between two adjacent RBs in the first resource set in each subband is 10 RBs. A frequency hopping offset (hopping offset) in the subband #0 is 20 RBs, and a frequency hopping offset (hopping offset) in the subband #1 is 30 RBs. Resource allocation in the subband #0 starts from the RB #0 (that is, $RB_{START}=0$). Resource allocation in the subband #1 starts from the RB #100 (that is, $RB_{START}=100$).

In the subband #0, a resource block allocated by the network device to a terminal 1 is: $RB_{START}+l+i\cdot N$, where $RB_{START}=0$, l∈L, L={0}, i∈M, M={0,1}, and N=10. Therefore, the second resource set is:

0+{0}+{0,1}*10={0,10}

In the subband #1, a resource block allocated by the network device to the terminal 1 is: $RB_{START}+l+i\cdot N$, where $RB_{START}=100$, l∈L, L={0}, i∈M, M={0,2,4}, and N=10. Therefore, the second resource set is:

100+{0}+{0,2,4}*10={100,120,140}

That is, in the subband #0 and the subband #1, the second resource set allocated by the network device to the terminal 1 is: {0, 10}&{100, 120, 140}.

In the subband #0, a resource block set used for the uplink transmission in a first frequency hopping period is: (20+{0}+{0, 1}*10) mod 100={20, 30}, that is, the RB #20 and an RB #30.

In the subband #1, a resource block set used for the uplink transmission in the first frequency hopping period is: (130+{0}+{0, 2, 4}*10) mod 100+100={130, 150, 170}, that is, an RB #130, an RB #150, and an RB #170.

That is, in the subband 40 and the subband #1, a resource block set used for the uplink transmission in the first frequency hopping period is: {20, 30}&{130, 150, 170}.

In the subband #1, a resource block set used for the uplink transmission in a second frequency hopping period is: (40+{0}+{0, 1}*10) mod 100={40, 50}, that is, an RB #40 and an RB #50.

In the subband #2, a resource block set used for the uplink transmission in the second frequency hopping period is: (160+{0}+{0, 2, 4}*10) mod 100+100={160, 180, 100}, that is, an RB #160, the RB #180, and the RB #100.

That is, in the subband #0 and the subband #1, a resource block set used for the uplink transmission in the second frequency hopping period is: {40, 50}&{160, 180, 100}.

A resource block set used for the uplink transmission in each subsequent frequency hopping period may be deduced by analogy. Details are not described again.

Figure 10:
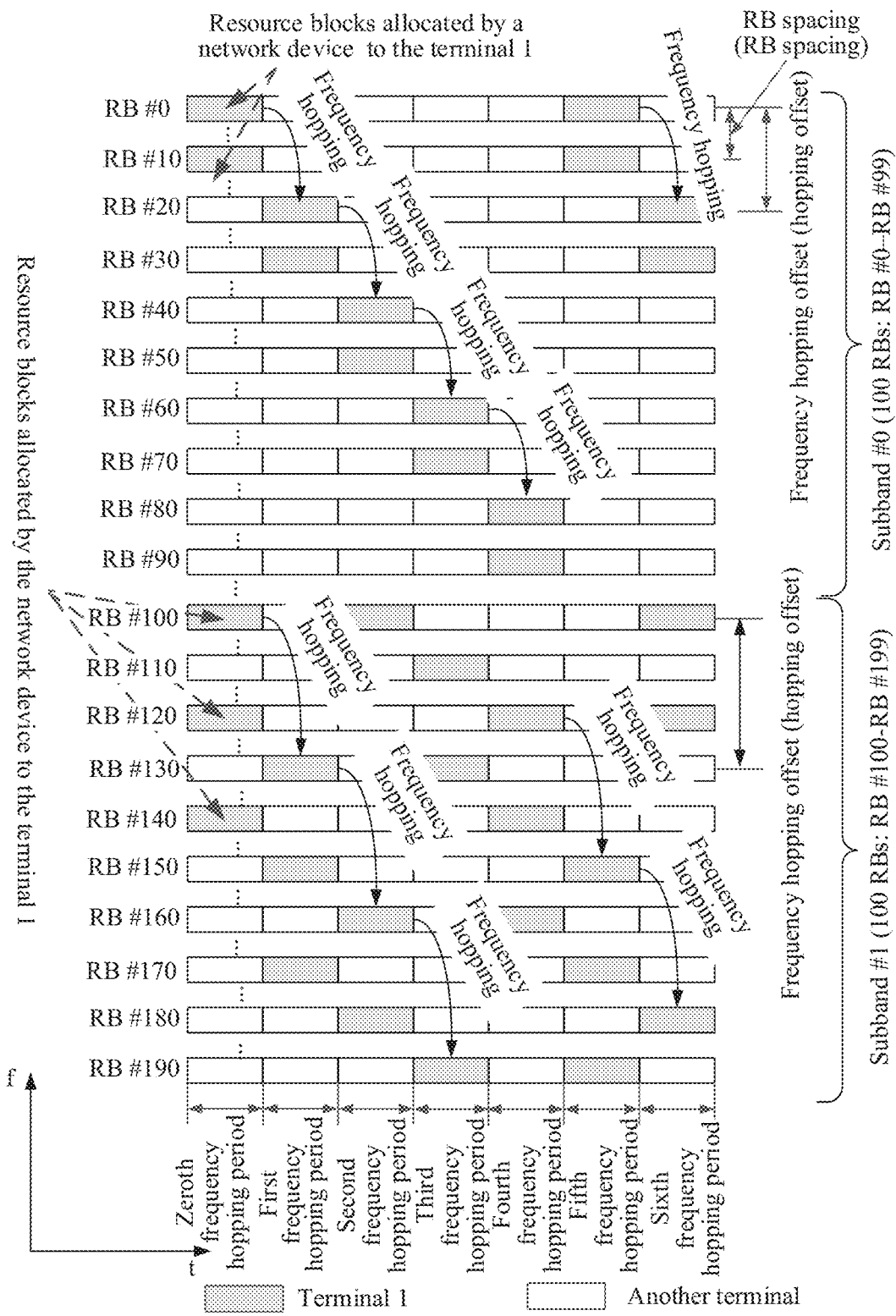
FIG. 10 is a schematic diagram of on which frequency hopping is performed in a subband according to still another embodiment of this application.

As can be seen from FIG. 10, through the frequency hopping, an accumulated bandwidth occupied by resource blocks (for example, the RB #0 and the RB #10 in the interlace #0 in the subband #0 and the RB #100, the RB #120, and an RB #140 in the interlace #0 in the subband #1) allocated by the network device to each terminal in different subbands in a specific time period (in the zeroth to the third frequency hopping periods) is 191 RBs, and a bandwidth occupancy of the 191 RBs is: 190*0.18 M/40 M=85.5%. That is, the 191 RBs occupy more than 80% of the system bandwidth, meeting an OCB requirement. In addition, a resource scheduling granularity is greatly reduced, and resource scheduling flexibility is improved.

In Embodiment 4 or Embodiment 5, structures of first resource sets in subbands may be the same or different. In a single subband, the network device may schedule some RBs in one or more first resource sets to the terminal.

It may be understood that, in Embodiment 4 or Embodiment 5, examples of the system transmission bandwidth should not be construed as a limitation, and are merely for ease of description of the solution. The frequency hopping is performed cyclically within a range of a total system transmission bandwidth, or within a range of a transmission bandwidth corresponding to the subband, or in the first resource set to which the second resource set belongs.

In addition, in any one of the foregoing embodiments, to facilitate correct reception by the network device, when sending an uplink signal, the terminal may further send a reference signal to the network device. In each time unit occupied by the uplink transmission, a frequency domain position of a resource carrying the reference signal may be the same as a frequency domain position of a resource block carrying the uplink signal. Optionally, the reference signal may be located at a specified position (for example, a first symbol) in each uplink transmission gap in time domain.

Figure 11:
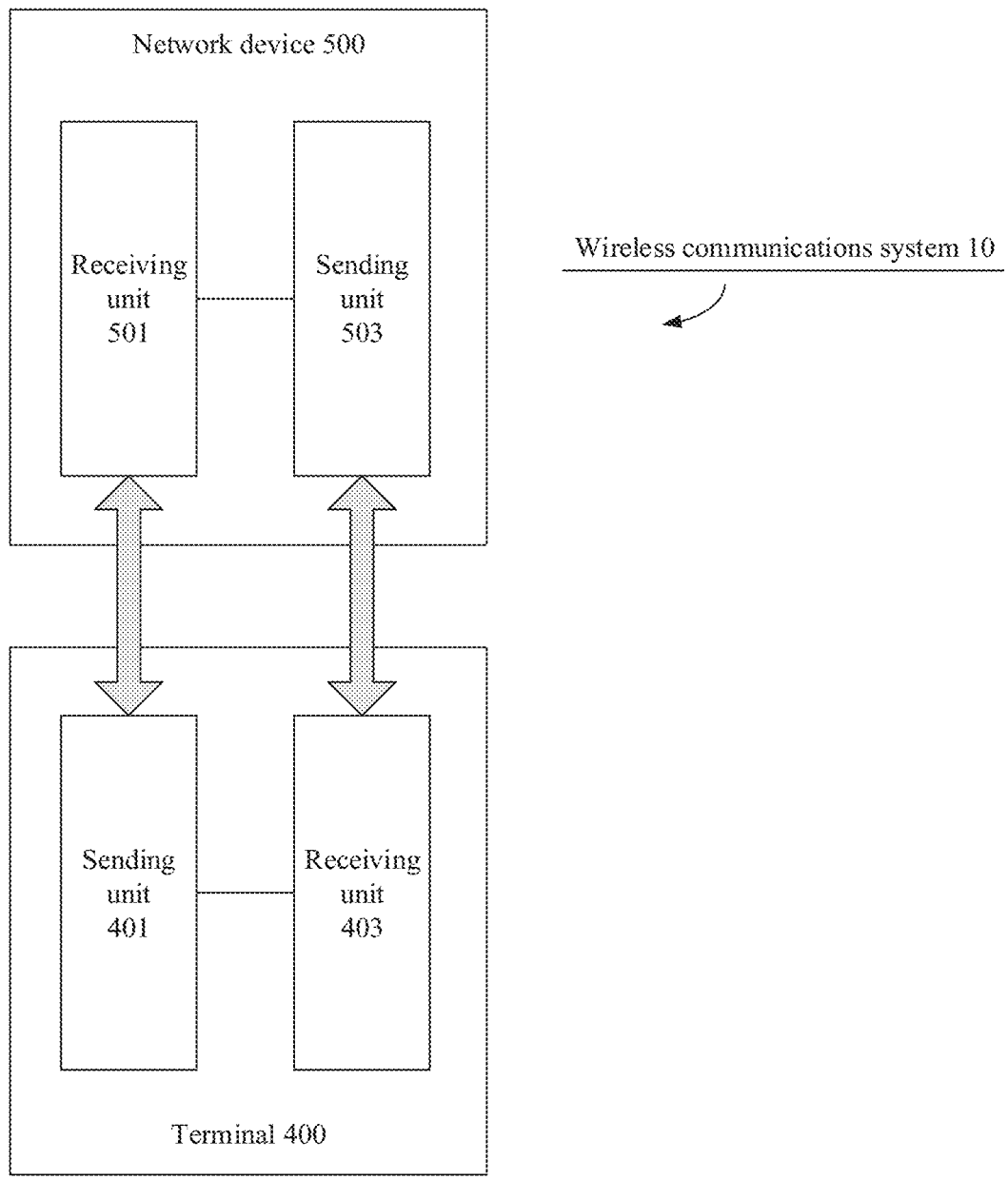
FIG. 11 is a schematic structural diagram of a wireless communications system, a network device, and a terminal according to an embodiment of this application.

FIG. 11 shows a wireless communications system 10 according to an embodiment of this application, and a network device 500 and a terminal 400 in the wireless communications system 10. The network device 500 may be the network device in the foregoing method embodiments, and may be configured to: receive a scheduling request of the terminal, and allocate an uplink signal transmission resource to the terminal in an unlicensed frequency band. The terminal 400 may be the terminal in the foregoing method embodiments, and may perform uplink transmission on an idle bandwidth detected through LBT based on a scheduling indication of the network device 500.

As shown in FIG. 11, the network device 500 may include a receiving unit 501 and a sending unit 503.

The sending unit 503 may be configured to send resource scheduling information and frequency hopping information to the terminal 400. The resource scheduling information is used to indicate a second resource set allocated by the network device to the terminal 400, and the frequency hopping information is used to indicate a frequency hopping manner associated with the second resource set. The second resource set may include some resource blocks in the first resource set, and the first resource set is an integer quantity of resource blocks that are evenly distributed in frequency domain.

The receiving unit 501 may be configured to receive an uplink signal sent by the terminal 400. The uplink signal is carried on an idle resource block that is used for the uplink transmission and that is detected by the terminal 400. Herein, resource blocks used for the uplink transmission are distributed in a plurality of time units, a structure of a resource block used for the uplink transmission in each time unit is the same as a structure of the second resource set, and a difference between frequency locations of resource blocks used for the uplink transmission in adjacent time units is a first offset.

As shown in FIG. 11, the terminal 400 may include: a sending unit 401 and a receiving unit 403.

The receiving unit 403 may be configured to receive the resource scheduling information sent by the network device 500. The resource scheduling information is used to indicate the second resource set allocated by the network device 500 to the terminal. The second resource set may include some resource blocks in the first resource set, and the first resource set is an integer quantity of resource blocks that are evenly distributed in frequency domain.

The sending unit 401 may be configured to perform, based on the resource scheduling information, the uplink transmission on the detected idle resource block used for the uplink transmission. Herein, the resource blocks used for the uplink transmission may be distributed in the plurality of time units, the structure of the resource block used for the uplink transmission in each time unit is the same as the structure of the second resource set, and the difference between the frequency locations of the resource blocks used for the uplink transmission in adjacent time units is the first offset.

Optionally, the network device 500 does not need to send the frequency hopping information to the terminal 400, and a specified frequency hopping pattern (frequency hopping pattern) on which the second resource set allocated by the network device 500 to the terminal 400 is based may also be defined by a protocol. To be specific, one or more of the frequency hopping information may be defined by the protocol. For example, the protocol may define that a frequency hopping offset is 10 RBs, or define that a frequency hopping period is one mini-slot. The example is merely used to explain this application and shall not be construed as a limitation.

In this application, frequency hopping may be performed, in the following manners, on the resource block allocated by the network device 500 to the terminal 400.

In a first manner, the frequency hopping is performed circularly based on an entire system bandwidth. Herein, the system bandwidth is divided into a plurality of first resource sets, and the first resource set includes a plurality of RBs that are evenly distributed in the entire system bandwidth.

Optionally, the second resource set allocated by the network device 500 to the terminal 400 may include an integer quantity of consecutive or nonconsecutive resource blocks in the first resource set.

Optionally, the second resource set allocated by the network device 500 to the terminal 400 may include some resource blocks in at least one first resource set.

In a second manner, the frequency hopping is performed circularly based on a subband. Herein, the first resource set may be an integer quantity of resource blocks that are evenly distributed in a single subband.

Optionally, the second resource set allocated by the network device 500 to the terminal 400 may include some resource blocks in at least one first resource set in a same subband.

Optionally, the second resource set allocated by the network device 500 to the terminal 400 may include some resource blocks in at least one first resource set in different subbands.

It may be understood that for specific implementation of the functional units included in the network device 500 and the terminal 400, refer to the foregoing embodiments. Details are not described herein again.

In addition, an embodiment of the present invention further provides a wireless communications system. The wireless communications system may be the wireless communications system 200 shown in FIG. 2, or the wireless communications system 10 shown n FIG. 11, and may include a network device and a terminal. The terminal may be the terminal in the foregoing embodiments, and the network device may be the network device in the foregoing embodiments. Specifically, the terminal may be the terminal 300 shown in FIG. 3, and the network device may be the network device 400 shown in FIG. 4. The terminal may alternatively be the terminal 400 shown in FIG. 11, and the network device may alternatively be the network device 500 shown in FIG. 11. For specific implementation of the network device and the terminal, refer to the foregoing embodiments. Details are not described herein again.

Using the terminal shown in FIG. 3 as an example, the terminal processor 304 is configured to invoke an instruction stored in the memory 312 to control the transmitter 306 to perform sending in unlicensed and/or licensed frequency bands and control the receiver 308 to perform receiving in the unlicensed and/or licensed frequency bands. The transmitter 306 is configured to support the terminal in performing a process of transmitting data and/or signaling. The receiver 308 is configured to support the terminal in performing a process of receiving the data and/or signaling. The memory 312 is configured to store program code and data of the terminal.

Specifically, the receiver 308 may be configured to receive resource scheduling information sent by the network device. The resource scheduling information may be used to indicate a second resource set allocated by the network device to the terminal. The second resource set may include at least one resource block, the at least one resource block is from a first resource set, and the first resource set is an integer quantity of resource blocks that are evenly distributed in frequency domain. The transmitter 306 may be configured to perform uplink transmission on a detected idle frequency domain resource based on the resource scheduling information. Herein, the uplink transmission occupies a plurality of time units. A resource structure of a resource block used for the uplink transmission in each time unit is the same as a resource structure of the second resource set, and frequency locations of resource blocks used for the uplink transmission in adjacent time units are different. In this way, it can be ensured that an accumulated bandwidth occupied by the uplink transmission in a specific time period (a plurality of frequency hopping periods) meets an OCB requirement, and more flexible resource allocation can be implemented.

For specific implementation of components in the terminal, refer to the embodiments corresponding to FIG. 5 to FIG. 10. Details are not described herein again.

Using the network device shown in FIG. 4 as an example, the network device processor 405 is configured to control the transmitter 407 to perform sending in unlicensed and/or licensed frequency bands, and control the receiver 409 to perform receiving in the unlicensed and/or licensed frequency bands. The transmitter 407 is configured to support the network device in performing a process of transmitting data and/or signaling. The receiver 409 is configured to support the network device in performing a process of receiving the data and/or signaling. The memory 405 is configured to store program code and data of the network device.

Specifically, the transmitter 407 may be configured to send the resource scheduling information and frequency hopping information to the terminal device. The resource scheduling information may be used to indicate the second resource set allocated by the network device to the terminal, and the frequency hopping information may be used to indicate a frequency hopping pattern associated with the second resource set. The second resource set includes at least one resource block, the at least one resource block is from a first resource set, and the first resource set is an integer quantity of resource blocks that are evenly distributed in frequency domain. The receiver 409 may be configured to receive an uplink signal sent by the terminal device. Herein, the uplink signal is carried on the idle frequency domain resource that is detected by the terminal and that is used for the uplink transmission. The uplink signal occupies a plurality of time units. A resource structure of a resource block used for the uplink transmission in each time unit is the same as a resource structure of the second resource set, and frequency locations of resource blocks used for the uplink transmission in adjacent time units are different.

For specific implementation of components in the network device, refer to the embodiments corresponding to FIG. 5 to FIG. 10. Details are not described herein again.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments are performed. The foregoing storage medium includes: any medium that can store program code, such as a ROM or a random access memory RAM, a magnetic disk or an optical disc, or the like.

What is claimed is:

1. A terminal device, comprising:
a receiver, the receiver configured to receive resource scheduling information sent by a network device, wherein the resource scheduling information is used to indicate a second resource set allocated by the network device to the terminal device, wherein the second resource set is from a first resource set, wherein the first resource set is an integer quantity of resource blocks that are evenly distributed in frequency domain, wherein the first resource set is comprised in a system bandwidth, a quantity of resource blocks of the first resource set is less than a quantity of resource blocks of the system bandwidth, and two adjacent resource blocks in the first resource set are not adjacent resource blocks in the system bandwidth; and
a transmitter, the transmitter configured to perform uplink transmission on a detected idle frequency domain resource based on the resource scheduling information, wherein the uplink transmission occupies a plurality of time units, wherein a resource structure of a resource block used for the uplink transmission in each time unit is the same as a resource structure of the second resource set, and wherein frequency locations of resource blocks used for the uplink transmission in adjacent time units are different.

2. The terminal device according to claim 1, wherein the first resource set is an integer quantity of resource blocks that are evenly distributed in the system bandwidth, and wherein a resource structure of the integer quantity of resource blocks is related to at least one of the system bandwidth or a subcarrier spacing.

3. The terminal device according to claim 2, wherein the resource scheduling information comprises: an index of the first resource set to which the second resource set belongs and an index of the second resource set in the first resource set.

4. The terminal device according to claim 1, wherein the first resource set is an integer quantity of resource blocks that are evenly distributed in a subband, and wherein:
the second resource set comprises some resource blocks in at least one first resource set in a same subband; or
the second resource set comprises some resource blocks in at least one first resource set in different subbands.

5. The terminal device according to claim 4, wherein the resource scheduling information comprises: an index of the first resource set to which the second resource set belongs, an index of the second resource set in the first resource set, and an index of a subband in which the second resource set is located.

6. The terminal device according to claim 4, wherein a difference between the frequency locations of the resource blocks used for the uplink transmission in adjacent time units is a frequency hopping offset, and wherein in a single subband, a resource block set used for the uplink transmission in a $p^{th}$ frequency hopping period is:

$$[(\tilde{RB}_{start}^{p}+l+i\cdot N) \bmod N_{RB}^{SB}]+kN_{RB}^{SB}$$

wherein:
$\tilde{RB}_{start}^{p}$ indicates an index of a start resource block used for the uplink transmission in the $p(p>1)^{th}$ frequency hopping period in the single subband;

$l \in L$, wherein the set L comprises an index of the first resource set to which a resource block allocated to the terminal device in the single subband belongs;
$i \in M$, wherein the set M comprises an index, in the first resource set to which the resource block allocated to the terminal device in the single subband belongs, of the resource block allocated to the terminal device in the single subband;
N is a spacing between two adjacent resource blocks in the first resource set;
$k \in K$, wherein the set K comprises an index of a subband in which the second resource set is located;
$N_{RB}^{SB}$ indicates a bandwidth of the subband; and
the following is satisfied:

$$\tilde{RB}_{start}^{0} = RB_{START},$$

$$\tilde{RB}_{start}^{p} = [(\tilde{RB}_{start}^{p-1}+N_{hopping\_offset}) \bmod N_{RB}^{SB}]+ kN_{RB}^{SB}$$

wherein $RB_{START}$ indicates an index of a start resource block allocated to the terminal device in the single subband, wherein $\tilde{RB}_{start}^{p-1}$ indicates an index of a start resource block used for the uplink transmission in a $(p-1)^{th}$ frequency hopping period in the single subband, and wherein $N_{hopping\_offset}$ is the frequency hopping offset.

7. The terminal device according to claim 1, wherein a difference between the frequency locations of the resource blocks used for the uplink transmission in adjacent time units is a frequency hopping offset, and wherein a resource block set used for the uplink transmission in a $p^{th}$ frequency hopping period is:

$$(\tilde{RB}_{start}^{p}+l+i\cdot N) \bmod N_{RB}^{Hopping}$$

wherein:
$\tilde{RB}_{start}^{p}$ indicates an index of a start resource block used for the uplink transmission in the $p(p>1)^{th}$ frequency hopping period;
$N_{RB}^{Hopping}$ indicates a total quantity of resource blocks that can be used for frequency hopping transmission;
$l \in L$, wherein in set L comprises the index of the first resource set to which the second resource set belongs;
$i \in M$, wherein the set M comprises an index, in the first resource set to which the second resource set belongs, of a resource block in the second resource set;
N is a spacing between two adjacent resource blocks in the first resource set; and
the following is satisfied:

$$\tilde{RB}_{start}^{0} = RB_{START},$$

$$\tilde{RB}_{start}^{p} = (\tilde{RB}_{start}^{p-1}+N_{hopping\_offset}) \bmod N_{RB}^{Hopping}$$

wherein $RB_{START}$ indicates an index of a start resource block allocated to the terminal device, wherein $\tilde{RB}_{start}^{p-1}$ indicates an index of a start resource block used for the uplink transmission in a $(p^{-1})^{th}$ frequency hopping period, and $N_{hopping\_offset}$ is the frequency hopping offset.

8. The terminal device according to claim 1, wherein the transmitter is configured to send a reference signal to the network device, wherein in each uplink transmission gap, a frequency location of a resource block carrying the reference signal is the same as a frequency location of a resource block carrying an uplink signal.

9. The terminal device according to claim 1, wherein a spacing between the two adjacent resource blocks in the first resource set is more than one resource block, and wherein a resource block set used for the uplink transmission in a frequency hopping period is determined based on the spacing.

10. A network device, comprising:
a transmitter, the transmitter configured to send resource scheduling information and frequency hopping information to a terminal device, wherein the resource scheduling information is used to indicate a second resource set allocated by the network device to the terminal device, wherein the frequency hopping information is used to indicate a frequency hopping pattern associated with the second resource set, wherein the second resource set comprises at least one resource block, wherein the at least one resource block is from a first resource set, wherein the first resource set is an integer quantity of resource blocks that are evenly distributed in frequency domain, wherein the first resource set is comprised in a system bandwidth, a quantity of resource blocks of the first resource set is less than a quantity of resource blocks of the system bandwidth, and two adjacent resource blocks in the first resource set are not adjacent resource blocks in the system bandwidth; and
a receiver, the receiver configured to receive an uplink signal sent by the terminal device, wherein the uplink signal is carried on an idle frequency domain resource that is used for uplink transmission and that is detected by the terminal device, wherein the uplink signal occupies a plurality of time units, wherein a resource structure of a resource block used for the uplink transmission in each time unit is the same as a resource structure of the second resource set, and wherein frequency locations of resource blocks used for the uplink transmission in adjacent time units are different.

11. The network device according to claim 10, wherein the first resource set is an integer quantity of resource blocks that are evenly distributed in the system bandwidth, and wherein a resource structure of the integer quantity of resource blocks is related to at least one of the system bandwidth or a subcarrier spacing.

12. The network device according to claim 11, wherein the resource scheduling information comprises: an index of the first resource set to which the second resource set belongs and an index of the second resource set in the first resource set.

13. The network device according to claim 10, wherein the first resource set is an integer quantity of resource blocks that are evenly distributed in a subband, and wherein:
the second resource set comprises some resource blocks in at least one first resource set in a same subband; or
the second resource set comprises some resource blocks in at least one first resource set in different subbands.

14. The network device according to claim 13, wherein the resource scheduling information comprises: an index of the first resource set to which the second resource set belongs, an index of the second resource set in the first resource set, and an index of a subband in which the second resource set is located.

15. The network device according to claim 10, wherein the frequency hopping information comprises at least one of the following: a frequency hopping offset $N_{hopping\_offset}$ associated with the second resource set, a total frequency hopping bandwidth associated with the second resource set, or a frequency hopping period associated with the second resource set.

16. The network device according to claim 10, wherein the receiver is further configured to receive a reference signal sent by the terminal device, wherein in each time unit occupied by the uplink transmission, a frequency location of a resource carrying the reference signal is the same as a frequency location of a resource block carrying the uplink signal.

17. A signal transmission method, comprising:
receiving, by a terminal device, resource scheduling information sent by a network device, wherein the resource scheduling information is used to indicate a second resource set allocated by the network device to the terminal device, wherein the second resource set comprises at least one resource block, wherein the at least one resource block is from a first resource set, wherein the first resource set is an integer quantity of resource blocks that are evenly distributed in frequency domain, wherein the first resource set is comprised in a system bandwidth, a quantity of resource blocks of the first resource set is less than a quantity of resource blocks of the system bandwidth, and two adjacent resource blocks in the first resource set are not adjacent resource blocks in the system bandwidth; and
performing, by the terminal device, uplink transmission on a detected idle frequency domain resource based on the resource scheduling information, wherein the uplink transmission occupies a plurality of time units, wherein a resource structure of a resource block used for the uplink transmission in each time unit is the same as a resource structure of the second resource set, and wherein frequency locations of resource blocks used for the uplink transmission in adjacent time units are different.

18. The method according to claim 17, wherein the first resource set is an integer quantity of resource blocks that are evenly distributed in the system bandwidth, and wherein a resource structure of the integer quantity of resource blocks is related to at least one of the system bandwidth or a subcarrier spacing.

19. The method according to claim 18, wherein the resource scheduling information comprises: an index of the first resource set to which the second resource set belongs and an index of the second resource set in the first resource set.

20. The method according to claim 17, wherein the first resource set is an integer quantity of resource blocks that are evenly distributed in a subband, and wherein:
the second resource set comprises some resource blocks in at least one first resource set in a same subband; or
the second resource set comprises some resource blocks in at least one first resource set in different subbands.

21. The method according to claim 20, wherein the resource scheduling information comprises: an index of the first resource set to which the second resource set belongs, an index of the second resource set in the first resource set, and an index of a subband in which the second resource set is located.

* * * * *